US012200028B2

United States Patent
Rubery et al.

(10) Patent No.: US 12,200,028 B2
(45) Date of Patent: Jan. 14, 2025

(54) AGGREGATION AND DISTRIBUTION OF DIVERSE MULTIMEDIA FEEDS

(71) Applicant: Zoom Video Communications, Inc., San Jose, CA (US)

(72) Inventors: Dennis Paul Rubery, Pittsford, NY (US); Shane Paul Springer, Oregon City, OR (US); Chi-chian Yu, San Ramon, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 4 days.

(21) Appl. No.: 18/077,360

(22) Filed: Dec. 8, 2022

(65) Prior Publication Data

US 2024/0195850 A1   Jun. 13, 2024

(51) Int. Cl.
*H04L 65/403* (2022.01)

(52) U.S. Cl.
CPC ................ *H04L 65/403* (2013.01)

(58) Field of Classification Search
CPC .................................................. H04L 65/403
USPC ....................................................... 709/204
See application file for complete search history.

(56) References Cited

U.S. PATENT DOCUMENTS

| | | | |
|---|---|---|---|
| 2005/0288951 A1* | 12/2005 | Stone ..................... | G06Q 99/00 709/204 |
| 2007/0268121 A1* | 11/2007 | Vasefi .................... | H04N 7/181 348/E7.086 |
| 2011/0231903 A1* | 9/2011 | Springer ............ | H04N 21/6125 709/231 |
| 2016/0057391 A1* | 2/2016 | Block ................ | H04L 65/4025 348/14.07 |
| 2019/0149731 A1* | 5/2019 | Blazer .................... | G06F 3/011 348/39 |
| 2020/0211720 A1* | 7/2020 | Goldberg ............... | G16H 10/60 |
| 2022/0086202 A1* | 3/2022 | Ingale .................... | H04L 67/01 |
| 2024/0069851 A1* | 2/2024 | Link ................... | H04L 65/1096 |

\* cited by examiner

*Primary Examiner* — Nicholas R Taylor
*Assistant Examiner* — Chong G Kim
(74) *Attorney, Agent, or Firm* — Kilpatrick Townsend & Stockton LLP

(57) ABSTRACT

Systems and methods for aggregation and distribution of diverse multimedia feeds are provided herein. In an aspect, a method including establishing, by a video conference provider, a virtual meeting having a plurality of participants is provided. Each participant joined to the virtual meeting may use a respective client device to exchange one or more audio or video streams via the virtual meeting. The method may also include receiving, from a first client device, a request to share a multimedia stream from an external source with one or more of the client devices during the virtual meeting. Responsive to the request, the method may include receiving a connection to the multimedia stream from the external source and transmitting, by the video conference provider, the multimedia stream from the external source to the one or more client devices via the virtual meeting.

18 Claims, 12 Drawing Sheets

AGGREGATION AND DISTRIBUTION OF DIVERSE MULTIMEDIA FEEDS

FIELD

The present application generally relates to video conferences and more particularly relates to systems and methods for aggregation and distribution of diverse multimedia feeds.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
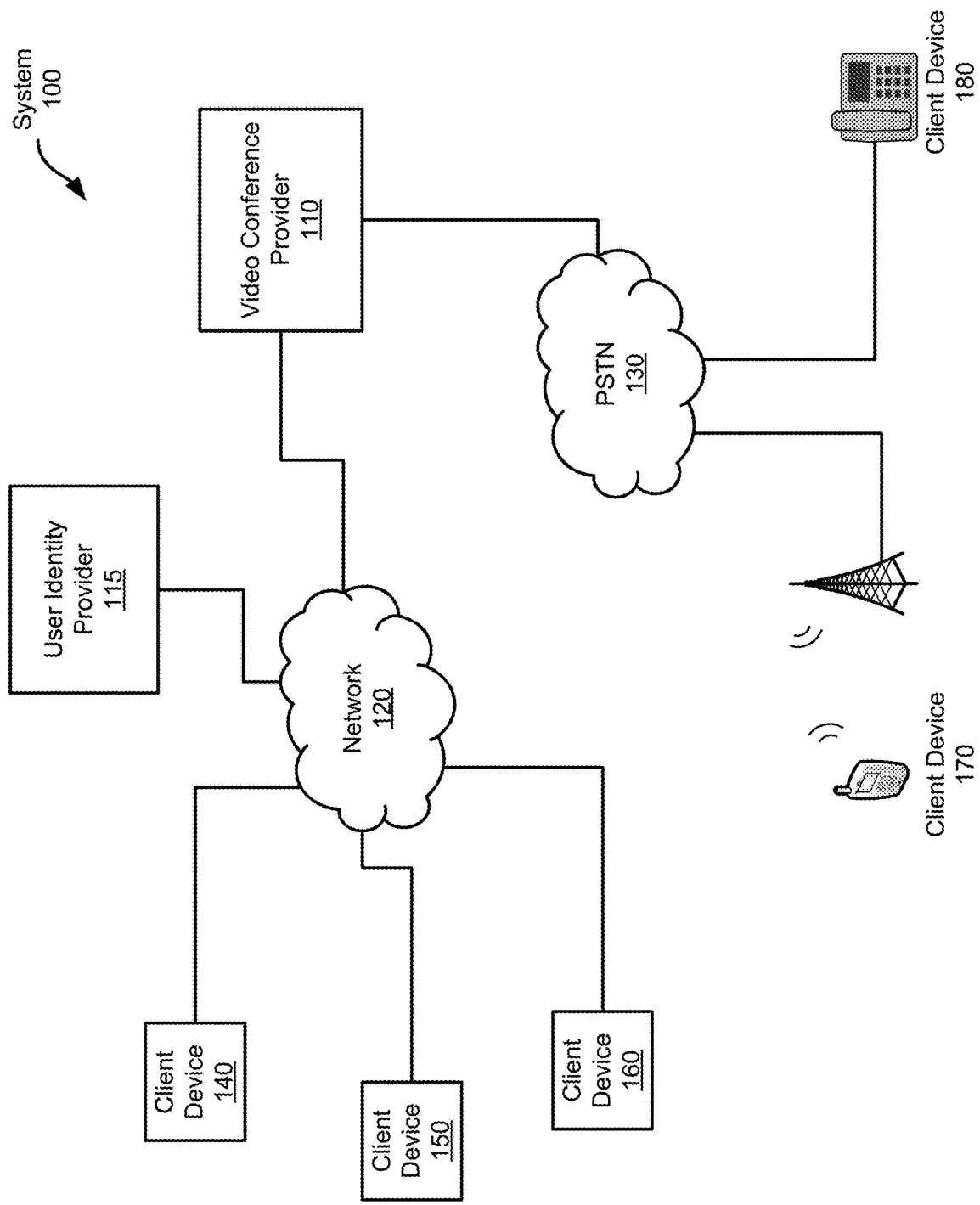
FIGS. 1, 2, and 3 show example systems for aggregation and distribution of diverse multimedia feeds, according to an embodiment herein.

Examples are described herein in the context of systems and methods for aggregation and distribution of diverse multimedia feeds. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

As the popularity of virtual meetings to replace conventional, in-person meetings, continues to rise, so too does the need to allow sharing of content within the virtual space. Currently, participants can share content directly from their client devices during virtual meetings, such as video and audio streams from each of their respective client devices, documents, or chat messages. Participants, however, cannot share video feeds from sources external to their client devices or the video conference provider during the virtual meeting. For example, if a participant wants to share the current activity of his or her dog at home with the other meeting participants, the participant cannot share a live stream of his or her home security camera. To share the live stream with the other meeting participants, the participant sharing the multimedia feed from an external source (hereinafter the "sharing participant"), would have to either provide the other meeting participants login information to the external source so they could each individually view the live stream themselves, or generate a recording of the multimedia stream from the external source and share it with the other meeting participants as a recording. Both of these options do not allow for seamless live-streaming of the multimedia stream, control of the playback status of the multimedia stream while sharing with the other meeting participants, or extended viewing of the multimedia stream (i.e., presently only the content in the recording is viewable).

To allow meeting participants to share multimedia streams from external sources during a virtual meeting, example systems and methods for aggregation and distribution of diverse multimedia feeds are provided herein. As described in greater detail below, the example systems and methods provided herein allow for a meeting participant to share a multi-media stream from an external source with other meeting participants during a virtual meeting. Specifically, the example aggregation and distribution system described herein can provide a connection between the video conference provider and a multimedia stream from an external source, such that the multimedia stream can be shared during the virtual meeting. This can allow for live streaming of multimedia streams from external sources, as well as granulated control over the playback status of the multimedia stream during the sharing of the stream.

Moreover, because the video conference provider can connect with the multimedia stream from the external source, if the sharing participant exits the virtual meeting, sharing of the multimedia stream may be maintained within the virtual meeting. This can allow for diverse multimedia streams to be added to virtual meetings, without requiring a corresponding participant to remain in the virtual meeting. For example, if a multimedia stream of a live streaming educational lecture is hosted by a school and managed by an IT department, a member of IT does not need to remain in the virtual meeting once the multimedia stream is connected with the video conference provider. Instead, the IT member can hand-off the controls of the multimedia stream to another member of the virtual meeting and exit, leaving the continued sharing of the multimedia stream with the other meeting participants. It should be noted that the term "feed" and "stream" may be used interchangeably herein.

This illustrative example is given to introduce the reader to the general subject matter discussed herein and the disclosure is not limited to this example. The following sections describe various additional non-limiting examples and examples of systems and methods for aggregation and distribution of diverse multimedia feeds.

Referring now to FIG. 1, FIG. 1 shows an example system 100 that provides video conferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
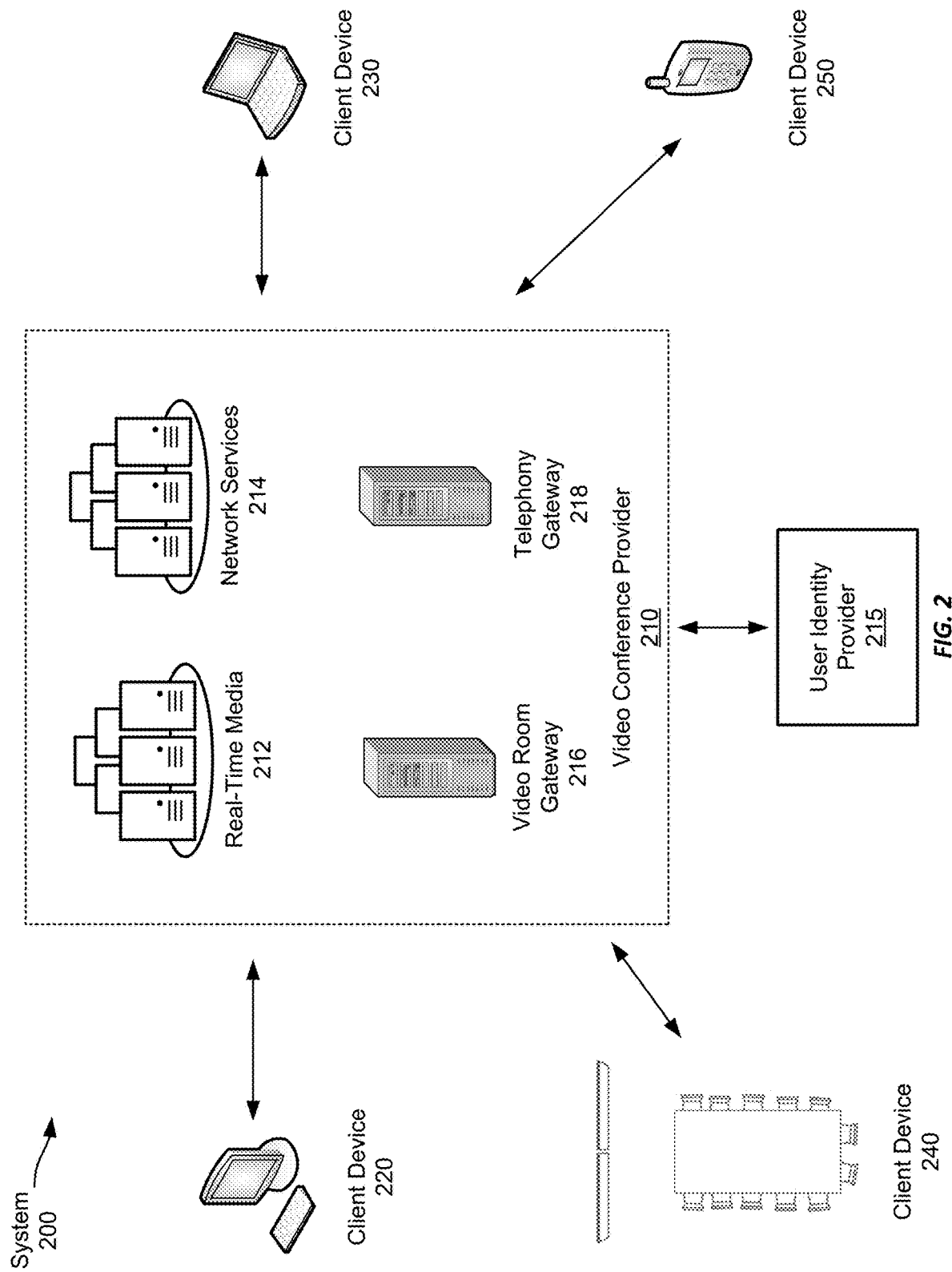

Video conference provider 110 allows clients to create video conference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides video conferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 200 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting.

When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosted by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
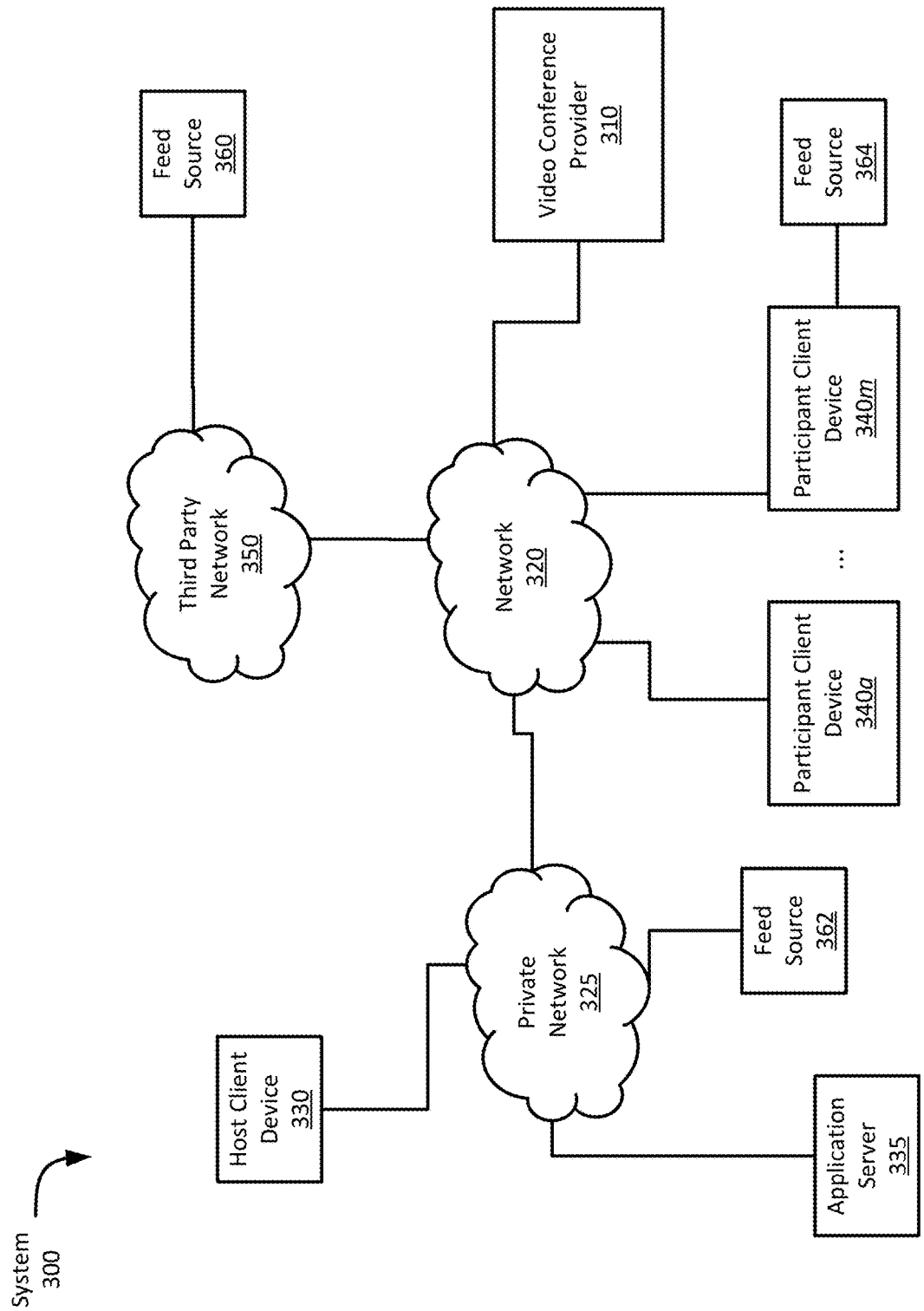

Referring now to FIG. 3, FIG. 3 shows an example system 300 for aggregation and distribution of diverse multimedia feeds, according to an embodiment herein. As illustrated, a video conference provider 310 provides video conference services to multiple different client devices 330 and 340a-m, generally as described above with respect to FIGS. 1 and 2. In this example, the client devices 330 and 340a-m participate in a virtual meeting hosted by the video conference provider 310. Client devices 340a-m connect to the video conference provider 310 over a public network 320, e.g., the internet; however, host client device 330 participates from within a private network 325, such as from their office at work. In addition to the host client device 330, an application server 335 is connected to the private network and makes various business applications available to the host client device 330. In different examples, these business applications may vary; however, in this example, the application server 335 provides applications access to business databases and files. To access these various resources, the host client device 330 has different client applications installed on it and may also have web applications accessible via a web browser, which may be stored as bookmarks in the web browser.

To start a meeting, the host client device 330 connects to the video conference provider 310 and begins a virtual meeting ("meeting") at the video conference provider 310, such as by beginning a scheduled meeting, generally as described above with respect to FIGS. 1 and 2. The video conference provider 310 may create and manage the meeting as discussed above.

Once the virtual meeting is started, participants may be able to interact with other participants and see their respective names, such as in close proximity to other participants' video streams or in a list of participants visible in a graphical user interface ("GUI"). In some embodiments, the participants may only be able to see information, e.g., names or video feeds, from the host(s) of the meeting or certain select participants that will be engaged in discussions during the virtual meeting, such as panelists in a panel discussion. Still other limits may be imposed on the various participants, such as their ability to react to occurrences during the meeting, e.g., participants may be allowed to interact with their GUI to raise their hand to ask a question but may not be allowed to provide any other feedback.

During the meeting one of the participant client devices 340a-m or the host client device 330 may request to record the meeting. The request to record the meeting may be transmitted to the video conference provider 310. In some embodiments, the video conference provider 310 may prompt the non-requesting client devices with a notification that the meeting is going to be recorded. For example, if the host client device 330 request to record the meeting, the participant client devices 340a-m may receive a notification that the meeting is going to be recorded. Once the meeting request is accepted, the video conference provider 310 may record the audio and video streams from all of the client devices, 340a-m and 330, until the recording is terminated, or the meeting is ended.

In some embodiments, the system 300 may include one or more feed sources, such as the feed sources 360, 362, and 364. The feed sources 360, 362, 364 may be or include a camera, a microphone, or other content capturing device or it may be a third-party's computing system that has one or more audio or video files available to be accessed and streamed. For example, a feed source may be a front door camera that is part of a home security system, a recording device (e.g., camera or microphone) that is in a lecture hall for recording lectures, a camera that is part of a facilities security system, television station equipment, cameras, a live-streaming device, or a recording device on a drone equipped with cellular or wireless connectivity, a portable audio or video capturing device, and the like At some point during the virtual meeting, a participant may request to share a multimedia stream from an external source. For example, the participant associated with the client device 340a may request to share a multimedia stream from a source external to the video conference provider 310 or his or her client device 340a (e.g., external source). In this example, the participant may request to share a multimedia stream from one or more feed sources 360, 362, 364. A feed source 360 may be associated or hosted by a third-party network 350. For example, the feed source 360 may be a front door camera hosted by a home security system or a remote server operated by an online video streaming service. As such, the client device 340a may access the multimedia stream from the feed source 360 via the third-party network 350, such as one associated with the home security system.

Upon transmitting the request to share the multimedia stream, the client device 340a may be prompted to provide information regarding the external source associated with the multimedia stream. That is, the video conference provider 310 may prompt the client device 340a to request information as to how to access the external source, such as the name of the third-party network 350, a link to the third-party network 350, a link to the content capturing device or remote server, or other information relating to the third-party network 350. For example, the client device 340a may input website information that he or she usually uses to access the multimedia stream or may select an application running on his or her client device 340a for accessing the multimedia stream. Additionally, scenarios for providing access information for the external source are provided in greater detail below with respect to FIG. 5.

In some embodiments, to access the feed source 360, and thereby the multimedia stream, the client device 340a may be required to provide authorization information. For example, the client device 340a may be prompted to input login information or credentials to access the multimedia stream. The video conference provider 310 may, in some embodiments, store the authorization information associated with the client device 340a and the third-party network 350 such that if the client device 340a requests to share the same multimedia stream in future virtual meetings, the multimedia stream can be shared without requiring the authorization information again.

Once the authorization information is provided, if required, a connection between the video conference provider 310 and the multimedia stream from the feed source 360 may be established. For example, the video conference provider 310 may establish a direct connection with the feed source 360. This can allow the video conference provider 310 to access and directly receive the multimedia stream from the feed source 360 without transmitting the multimedia stream to the client device 340a.

Once the video conference provider 310 is connected with the feed source 360, the video conference provider 310 may transmit the multimedia stream to one or more of the other participants within the virtual meeting. As will be described in greater detail below, the client device 340a may select, during the request to share the multimedia stream, which other client devices he or she wishes to share the multimedia stream. For example, the client device 340a may indicate to share the multimedia stream with all of the other participants (e.g., the client devices 330, and 340b-m) in the virtual meeting or the client device 340a may indicate to only share the multimedia stream with select participants, such as with the client devise 340b and 340c.

At some point during the virtual meeting, the host client device 330 may also request to share a multimedia stream from an external source. For example, the host client device 330 may request to share the multimedia stream from feed source 362. The feed source 362 may be accessed via the private network 325. For example, the feed source 362 may be a camera within an organization or educational institute and the host client device 330 may wish to share a live stream from the feed source 362 with the other participants of the meeting.

To share the multimedia stream during the virtual meeting, the host client device 330 may provide the video conference provider 310 access and any required authorization information, as provided above. Once the video conference provider 310 gains access to the feed source 362, the video conference provider 310 may establish a connection with the feed source 362. Using the connection, the video conference provider 310 may receive transmission of the multimedia stream from the feed source 362, such as, for example, via the private network 325 and the network 320. Upon receipt of the multimedia stream from the feed source 362, the video conference provider 310 may transmit the multimedia stream to one or more of the other meeting participants in accordance with the settings or instructions received from the host client device 330 as the sharing participant.

The participant client device 340m may also request to share a multimedia stream from an external source. For example, the participant client device 340m may request to share the multimedia stream from the feed source 364. The feed source 364 may be directly connected to the participant client device 340m such that the client device 340m does not need to go through any network to access the multimedia stream. For example, the feed source 364 may be a camera connected to the client device 340m. In some embodiments, the feed source 364 may be a different source than the device used to capture and share any audio or video streams from client device 340m during the virtual meeting. For example, the feed source 364 may be an external camera that is connected to the client device 340m, whereas a built-in camera of the client device 340m is used to capture a video stream from the client device 340m during the virtual meeting. In other embodiments, the feed source 364 may be the same as the device used to capture the audio or video streams of the client device 340*m* during the virtual meeting. As will be described in greater detail below, because the video conference provider 310 establishes a connection with the feed source 364, even if the participant associated with the client device 340*m* leaves the virtual meeting, the multimedia stream from the feed source 364 may continue to be transmitted to other participants within the virtual meeting.

Once the video conference provider 310 establishes a connection with each of the feed sources 360, 362, and 364, the video conference provider 310 may transmit each of the respective multimedia streams with the participants in the virtual meeting.

Figure 4:
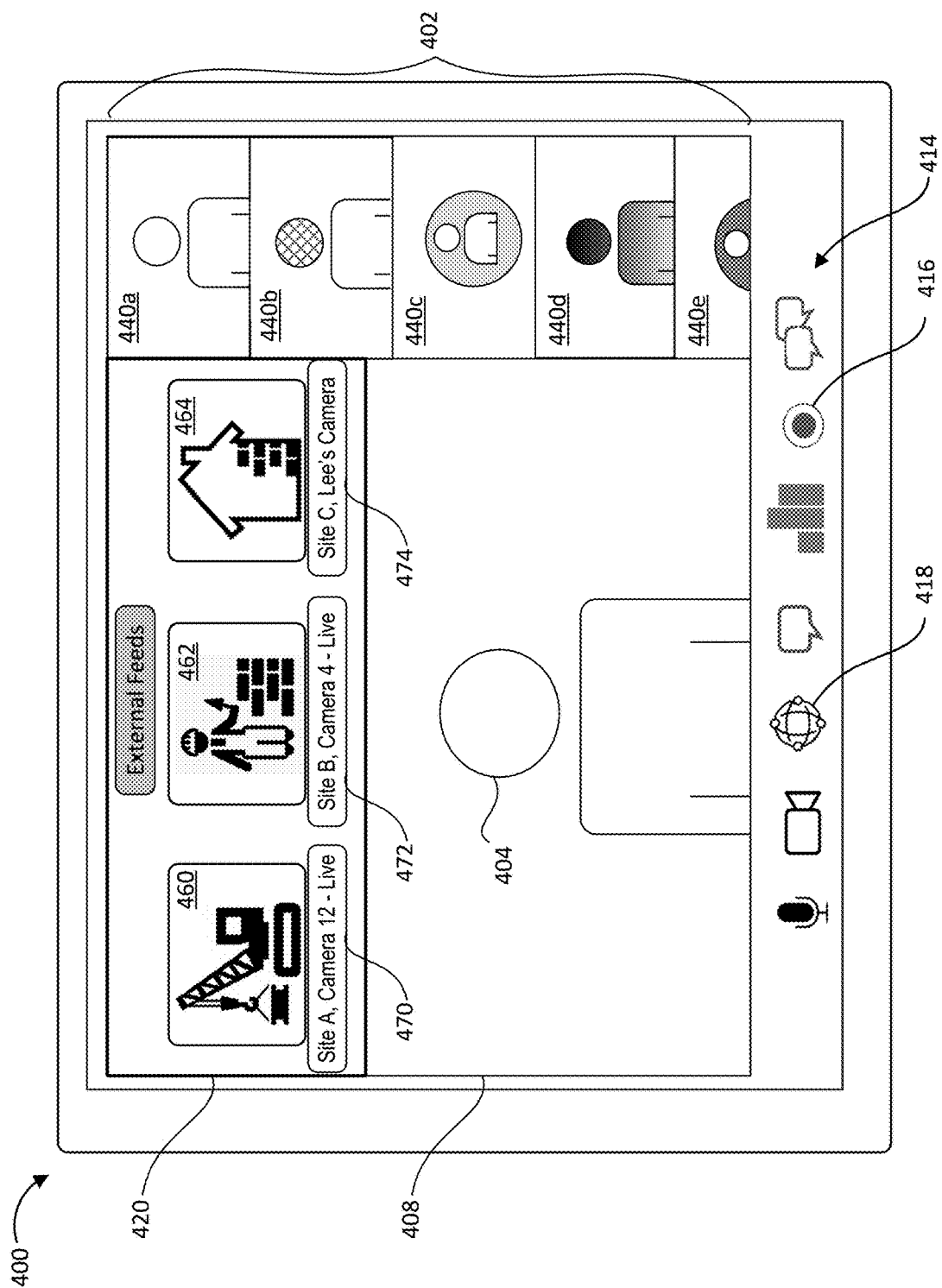
FIG. 4 illustrates a graphical user interface (GUI) during a virtual meeting providing aggregation and distribution of diverse multimedia feeds, according to an embodiment herein.

Referring now to FIG. 4, an example graphical user interface (GUI) 400 during a virtual meeting providing aggregation and distribution of diverse multimedia feeds is provided, according to an embodiment herein. For example, the GUI 400 may be provided by any client device, such as the client devices 330 or 340*a-m*, that joins a virtual meeting hosted by the video conference provider 310.

As shown, the GUI 400 may include a display 408. The display 408 may include a roster 402 of video streams received from client devices joined to the virtual meeting. For example, the roster 402 may include video streams of participants 440*a*-440*e* received from the client devices 340*a*-340*e* during a virtual meeting hosted by the video conference provider 310. In some embodiments, the roster may include a video stream of some or all of the participants of the virtual meeting. In other embodiments, the roster 402 may include a picture, image, representation, avatar, or a listing of some or all of the participants who have joined the virtual meeting. When a participant joins the virtual meeting, the joining participant is added to the roster 402.

Once a virtual meeting is initiated, video and audio streams may be exchanged between the participants, including the client devices 340*a*-340*e*. The display 408 may include the video stream of a currently speaking participant 404, which may be a host of the virtual meeting corresponding to the host client device 330. The audio stream from participant 404 may also be transmitted along with the display 408. In some embodiments, more than one participant may be speaking, and in such cases, display 408 may include two or more windows providing the video streams from the speaking participants.

The display 408 may include a dashboard 414 containing one or more action selections. For example, the dashboard 414 may include a recording selection 416 that allows a participant to record the streams of audio and video during the virtual meeting. In some embodiments, a virtual meeting may automatically be recorded when one or more multimedia streams from external sources are shared, while in other embodiments, the ability of a participant to invoke the recording selection 416 may be at the discretion of the meeting host. For example, when the meeting host generates the meeting invitation, the meeting host may select if meeting participants are able to record the meeting. In some embodiments, the dashboard 414 may include other selections such as a chat selection, a polling selection, and the like. Depending on the settings of individual client devices, recording may automatically be disabled for multimedia streams from that specific client device. Furthermore, access to the recording may be strictly limited to prevent unauthorized access of the recorded multimedia streams.

In some embodiments, the dashboard 414 may include a multimedia stream sharing selection 418 ("sharing selection 418"). The sharing selection may allow a participant to request to share a multimedia stream from an external source with one or more meeting participants. In some embodiments, upon selection of the sharing selection 418, the participant may be provided with a prompt to identify the multimedia feed for sharing, along with which other participants the sharing participant wishes to share the multimedia feed with.

Figure 5:
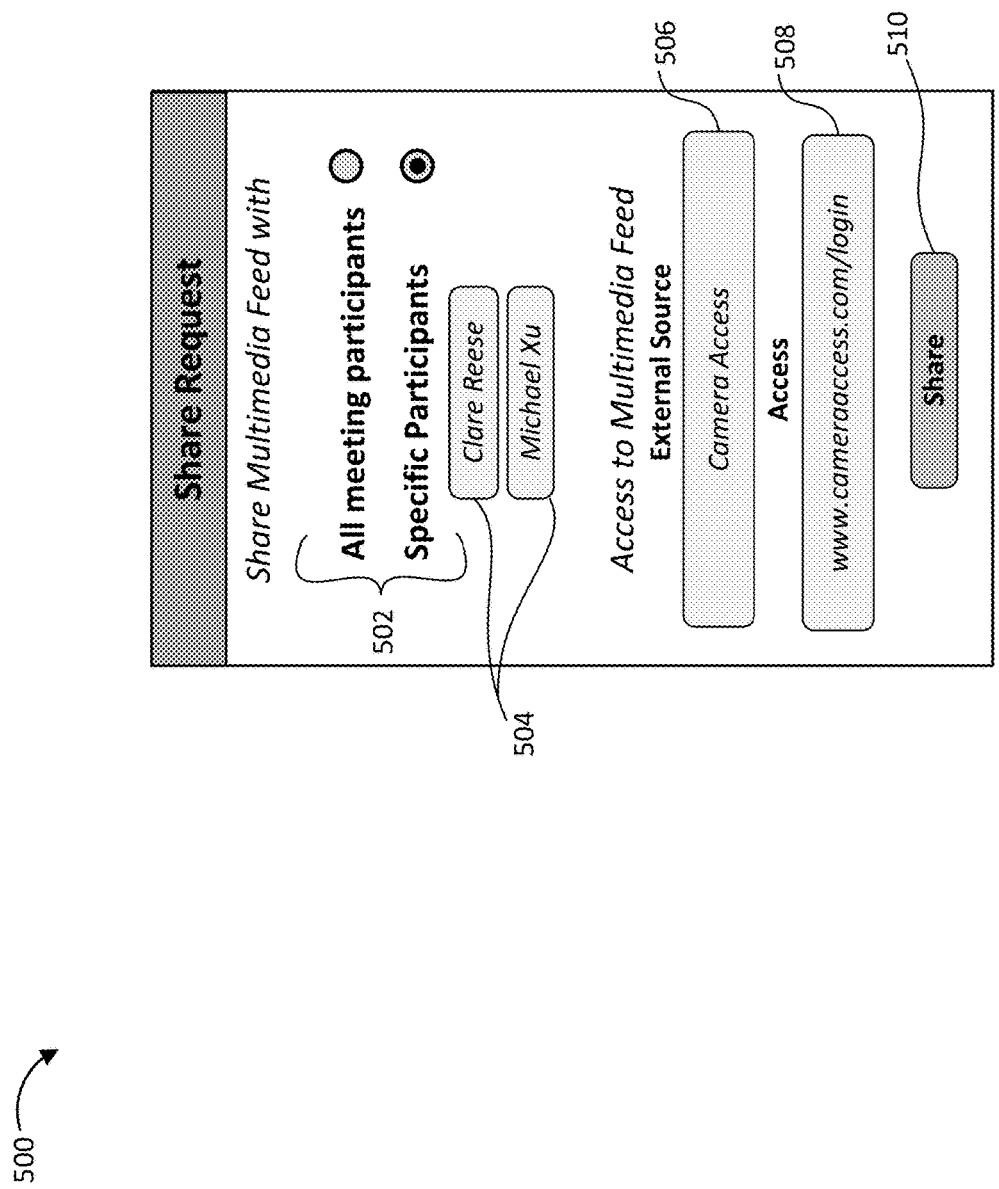
FIG. 5 illustrates a request prompt for sharing a multimedia stream during a virtual meeting, according to an embodiment herein.

Referring now to FIG. 5, a request prompt 500 for sharing a multimedia stream during a virtual meeting is provided, according to an embodiment herein. For example, the request prompt 500 may be provided on the display 408 in response to a participant selecting the sharing selection 418. The request prompt 500 may include participant options 502 for identifying with whom the multimedia stream should be shared. For example, as illustrated, the sharing participant may select to share the multimedia stream with all of the meeting participants, or the sharing participant may select to only share the multimedia stream with certain meeting participants. If the sharing participant selects to only share the multimedia stream with specific meeting participants, the sharing participant can input the specific meeting participant's name via inputs 504. In some embodiments, the inputs 504 may be or include a dropdown menu of the meeting participants present or who accepted the meeting invitation. While only two meeting participants are illustrated via inputs 504, it should be appreciated that any number of meeting participants may be identified for sharing the multimedia stream.

The request prompt 500 may also include a field to provide an external source input 506 and an access input 508. The external source input 506 may allow the sharing participant to identify the external source from which the multimedia stream is generated or streamed. For example, the external source may be a home camera system, a business camera system, a lecture hall recording system, and the like. In some embodiments, the sharing participant may be requested to provide a link or access information for accessing the multimedia stream. The access input 508 may allow the sharing participant to input a website, an application link, or other pathway for the video conference provider 310 to access the multimedia stream. As a default, the access input 508 may be hidden from other participants to protect the privacy of the sharing participant. In an example, the sharing participant may navigate via the access input 508 to an application associated with the multimedia stream. After providing the access information via access input 508, the sharing participant may be prompted to provide login or authorization information for accessing an account associated with the multimedia stream. Authorization information may include license information, login credentials, or other information required to gain access to the multimedia stream via the external source.

In some embodiments the authorization information may include a username, signature, and/or password to access the multimedia stream. In such cases, the authorization information may be encrypted or hidden upon input. In some embodiments, the sharing participant can indicate a time duration for how long the link to the multimedia stream is valid. For example, the sharing participant may indicate to keep the link to the multimedia stream live for an hour after termination of the meeting. This can allow the meeting participants to review the content of the multimedia stream after the meeting terminations. In other embodiments, as described herein, the link with the multimedia stream may terminate upon termination of the meeting or upon indication to terminate by the sharing participant or host.

In some embodiments, the request prompt 500 may include a URL that could be configured on a feed source device. For example, a URL could directly link the feed source device, such as a video capturing device on a drone, to the video conference provider 310 such that the feed source device directly streams content to the video conference provider 310.

Once the sharing participant provides the required information on the request prompt 500, the sharing participant may select a share button 510. Upon selection of the share button 510, the video conference provider 310 may establish a connection with the external source, specifically with the multimedia stream, using the access information. For example, the video conference provider 310 may establish a direct connection with the multimedia stream, thereby bypassing the need to go through a client device associated with the sharing participant to access the multimedia stream. The connection between the video conference provider 310 and the multimedia stream may maintain until the meeting is terminated or until the sharing participant or meeting host indicates to terminate the connection.

In some embodiments, the sharing participant may indicate to stop sharing the multimedia stream during the virtual meeting. The video conference provider 310, however, may maintain the connection with the multimedia stream until the meeting is terminated. This can allow the sharing participant to re-share the multimedia stream at a later point during the virtual meeting. In some embodiments, the connection between the video conference provider 310 and the multimedia stream may be provided only for a specified duration of time. For example, a sharing participant may indicate to only share the multimedia stream for a specified duration of time. After the duration of time is exhausted or lapses, the connection between the multimedia stream and the video conference provider 310 may be terminated. For example, a sharing participant may share the multimedia stream and indicate that the multimedia stream should be shared for the first hour of the virtual meeting. After an hour lapse during the meeting, the connection between the video conference provider 310 and the multimedia stream may be terminated. This can allow the sharing participant to have granular control over the sharing of the multimedia stream, even in the event that the sharing participant leaves the virtual meeting. As will be discussed in greater detail below, the aggregation and distribution systems herein can allow a sharing participant to share a multimedia stream during a virtual meeting and then leave the virtual meeting. Even though the sharing participant has left the virtual meeting, the sharing of the multimedia stream may be maintained until the connection with the video conference provider 310 is terminated.

In some embodiments, the video conference provider 310 may maintain a connection with the multimedia stream after the meeting is terminated. For example, a sharing participant may provide the video conference provider 310 with permission to maintain a connection with the multimedia stream after a meeting terminates. This can allow the sharing participant to easily share the multimedia stream during future virtual meetings without needing to provide access information or authorization information for the multimedia stream. For example, if a sharing participant frequently shares the multimedia stream during virtual meetings, the sharing participant may indicate that the video conference provider 310 can maintain the connection with the multimedia stream even when the virtual meeting terminates.

Returning now to FIG. 4, upon sharing a multimedia stream during a virtual meeting, the multimedia stream may be provided on an external feed panel 420. As illustrated, the external feed panel 420 may include a first multimedia stream tile 460, a second multimedia stream tile 462, and a third multimedia stream tile 464. While the example embodiments provided herein describe the multimedia streams being shared via the external feed panel 420, it should be appreciated that the multimedia stream tiles may be provided anywhere within the display 408.

Each of the multimedia stream tiles 460, 462, and 464 may include descriptive information associated with a respective multimedia stream. For example, the multimedia stream tile 460 may include descriptive information 470, the multimedia stream tile 462 may include descriptive information 472, and the multimedia stream 464 may include descriptive information 474. The descriptive information 470, 472, and 474 may include information regarding the source of the multimedia stream, time at which the provided multimedia stream is being gathered, and the like. For example, as illustrated, the descriptive information 470 indicates that the multimedia stream of tile 460 is from Site A, Camera 12 and is a live stream. In some embodiments, the descriptive information 470, 472, and 474 may be collected from the request prompt 500 or may be modified by a meeting host or co-host.

As depicted, the multimedia stream tiles 460, 462, and 464 may be positioned within the external feed panel 420. As can be appreciated, if there are numerous multimedia stream tiles, not all of the multimedia stream tiles 460, 462, and 464 may be visible within the external feed panel 420 at a time. If there is a large number of multimedia stream tiles, the external feed panel 420 may include a scroll (not shown) for viewing off-screen multimedia stream tiles. In some embodiments, the multimedia stream tiles 460, 462, and 464 (and other multimedia stream tiles if present) may be positioned within the external feed panel 420 based on a priority. A priority of a given multimedia stream tile may be based on a number of factors, such as how recently the multimedia stream was shared (e.g., the more recently shared multimedia streams may have a high priority for placement within the external feed panel 420), a time sensitivity of the multimedia stream tile (e.g., the multimedia stream that is shared for a specified time duration that is timing out soon may have a high priority), or the participant who shared the multimedia stream (e.g., if a host shared the multimedia stream, then the multimedia stream tile may have a higher priority over a multimedia stream tile shared by a co-host or a participant sharing the multimedia stream).

In other embodiments, the priority of a multimedia stream tile may be determined based on an interaction level of the multimedia stream tile. For example, if participants interact with the multimedia stream tile 460 more often within a predetermined time duration than they interact with the multimedia stream tile 462, then the multimedia stream tile 460 may have a higher priority than the multimedia stream tile 462. If over time, the multimedia stream tile 460 is interacted with less by members than the multimedia stream 336, then the multimedia stream 334 may be determined to have a lower priority of the multimedia stream tile 462 and the placement of the multimedia stream tile 460 within the external feed panel 420 may be changed.

The priority of a multimedia stream may be used to determine the placement of the multimedia stream tile within the external feed panel 420. For example, the higher the priority of a multimedia stream, the higher the placement of the multimedia stream tile may be within the external feed panel 420. A higher placement of the multimedia stream tile may mean that the multimedia stream is closer to a focus of the external feed panel 420. For example, per the illustration of FIG. 4, the further to the left within the external feed panel 420 that a multimedia stream tile is placed, the higher the visibility of the multimedia stream may be to participants of the virtual meeting. If a multimedia stream has a lower priority, then the multimedia stream tile may be placed further to the right within the external feed panel 420, meaning that the multimedia stream tile may be placed off-screen if there are numerous multimedia stream feeds having a higher priority. As depicted, the multimedia stream tile 460 may have a higher priority than the multimedia stream tile 462, and the multimedia stream tile 462 may have a higher priority than the multimedia stream tile 464. As should be appreciated, participants may be able to scroll to off-screen multimedia stream tiles.

In still another example, a sharing participant of a multimedia stream may pin a multimedia stream tile at a placement within the external feed panel 420. The pinning of a multimedia stream tile's placement may supersede any other factors that are used to determine a priority of the multimedia stream (e.g., interaction level, time sensitivity). For example, if a host pins the multimedia stream tile 460 in the highest priority placement position (here the furthest to the left within the external feed panel 420), then the multimedia stream tile 460 may stay in this placement regardless of a determined priority. That is, the multimedia stream tile 460 may stay in the highest priority placement position regardless of if the multimedia stream tile 462 or the multimedia stream tile 464 are determined to have a higher priority.

Although the external feed panel 420 illustrates the multimedia stream tiles 460, 462, and 464 as horizontally extending across the display 408, any other orientation or arrangement may be provided. For example, the external feed panel 420 may provide a grid view of the multimedia stream tiles 460, 462, and 464.

Figure 6:
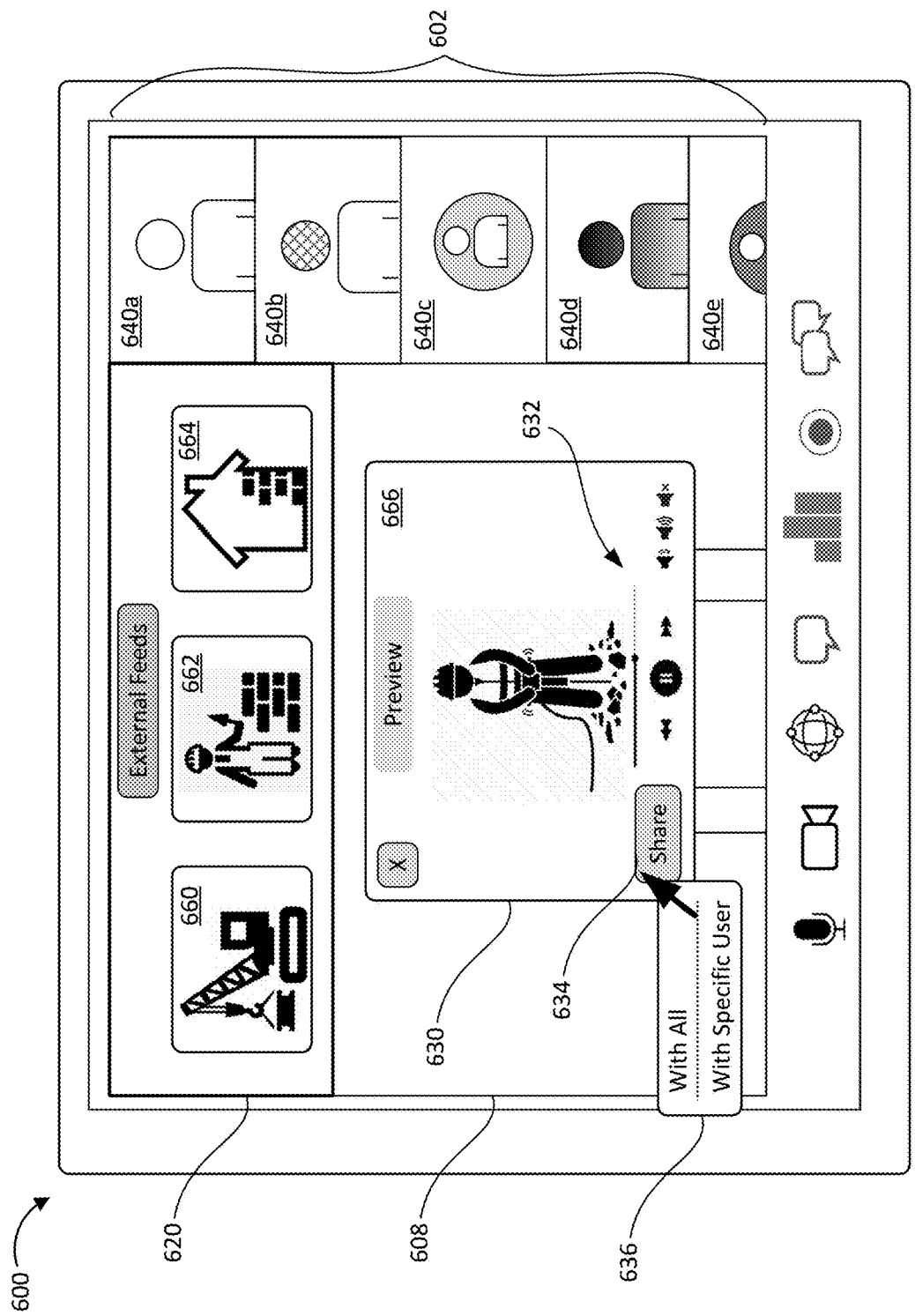
FIG. 6 illustrates a GUI providing a preview of a multimedia stream prior to sharing during a virtual meeting, according to an embodiment herein.

In some embodiments, prior to sharing a multimedia stream during a virtual meeting, the sharing participant may be provided with a preview of the multimedia stream. Referring now to FIG. 6, an example GUI 600 providing a preview 630 of a multimedia stream prior to sharing during a virtual meeting is illustrated, according to an embodiment herein. The GUI 600 may be the same or similar to the GUI 400, as described above with respect to FIG. 4. For example, the GUI 600 may include a roster 602 showing participants 640a-640e, which may be the same or similar to the roster 402 showing participants 440a-440e. Similarly, the GUI 600 may include a display 608, which may be the same or similar to the display 408.

As noted above, when a sharing participant selects to share a multimedia stream during the virtual meeting, the sharing participant may be provided with the preview 630 of the multimedia stream. Here, the preview 630 provides a view of the multimedia stream 666 as would be viewable by the other participants upon sharing. In some embodiments, the preview 630 may include controls 632 to allow the sharing participant to review the content of the multimedia stream 666 prior to sharing. That is, the sharing participant may want to review the contents of the multimedia stream 666 prior to sharing or the sharing participant may want to find a specific time of the multimedia stream 666 for sharing. For example, the sharing participant may review the multimedia stream 666 to identify that an event occurred 3 minutes ago on the multimedia stream 666. The sharing participant may wish the share the multimedia stream 666 to highlight the event during the meeting. As such, the preview 630 can allow the sharing participant to easily identify and share the multimedia stream 666 to highlight the event, without having to rewind or go through the multimedia stream 666 whilst sharing it with the other participants. Moreover, the controls 632 may allow the sharing participant to adjust a volume of an associated audio stream for the multimedia stream 666. For example, if the multimedia stream 666 is of a construction site, per the illustrative example, then the sharing participant may lower the volume of the audio stream prior to sharing the multimedia stream 666.

In some embodiments, the sharing participant may be able to duplicate the multimedia stream 666 within the preview 630 such to allow review of different timelines of the multimedia stream 666. For example, the sharing participant can generate a first preview 630 of the multimedia stream 666 and a second preview 630 of the multimedia stream 666. The first preview 630 and the second preview 630 may be two instances of the multimedia stream 666 that are side-by-side but are 10 seconds apart to show scene changes between the two times. In some embodiments, the sharing participant may record and provide the side-by-side sharing of the multimedia stream 666 to allow review after the meeting terminates.

In some embodiments, the preview 630 may provide a notification of whether the multimedia stream 666 is a real-time stream or not. For example, if the multimedia stream 666 is a real-time stream, and the sharing participant fast forwards pauses, or rewinds the feed, then the multimedia stream 666 would no longer be real-time. As such, a notification may be provided on the preview 630 to indicate that the multimedia stream 666 is no longer real-time. In some embodiments, the 'no-longer real-time' notification may include a time and date corresponding to the currently viewed portion of the feed such that viewers would know and understand the timing of the viewed stream. Additionally, any participant with the appropriate rights/controls may be able to freeze/review a stream outside of the real-time view of the stream.

In some embodiments, the preview 630 may also allow the sharing participant to identify who to share the multimedia stream 666 with. For example, if the sharing participant was not provided with a request prompt, such as the prompt 500, then the options 636 may allow the sharing participant to identify the meeting participants to share the multimedia stream 666 with. Options 636 illustrate another embodiment over options 502 for identifying who to share a multimedia stream with during a virtual meeting.

After the sharing participant has reviewed the multimedia stream 666 via the preview 630, the sharing participant may select the share button 634. Upon selecting the share button 634, the multimedia stream 666 may be shared with the other meeting participants, as identified by the sharing participant, via the external feed panel 620. For example, a multimedia stream tile may be generated for the multimedia stream 666 and provided alongside the multimedia stream tiles 660, 662, and 664 in the external feed panel 620.

In some embodiments, a dynamic prominence functionality may monitor and analyze the multimedia streams shared by the meeting participants. The dynamic prominence functionality may monitor and analyze the multimedia streams for content relevant to an event. An event may include an incident, someone speaking, or movement within a multimedia stream. For example, an event may include movement of a crane, a speaker beginning a lecture, or demolition of a building. In some embodiments, a sharing participant may identify an event for which the dynamic prominence functionality should monitor the shared multimedia streams for. In other embodiments, the dynamic prominence functionality may include software to identify an event without input from the sharing participant.

Upon identification of a relevant multimedia stream, the dynamic prominence functionality may increase a prominence of the relevant multimedia stream. By increasing the prominence of the relevant multimedia stream, the dynamic prominence functionality may direct the meeting participants' focus to the relevant multimedia stream.

Figure 7:
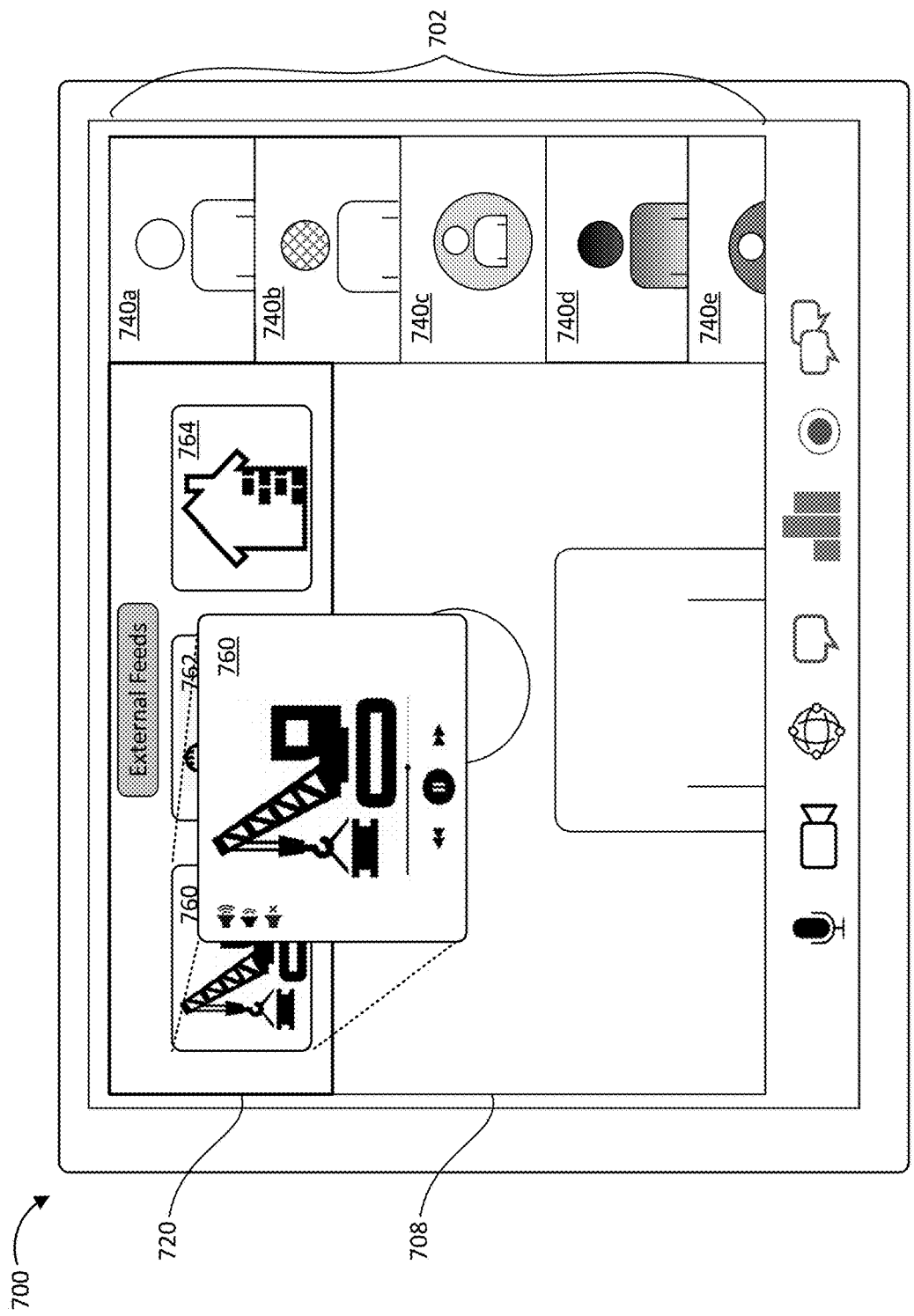
FIG. 7 illustrates a GUI having increased prominence of a multimedia stream, according to an embodiment herein.

Referring now to FIG. 7, an example GUI 700 having increased prominence of a multimedia stream is illustrated, according to an embodiment herein. The GUI 700 may be the same as the GUI 400 or the GUI 600. For example, the GUI 700 may include a roster 702 showing participants 740a-740e, which may be the same or similar to the roster 402 showing participants 440a-440e. Similarly, the GUI 700 may include a display 708, which may be the same or similar to the display 408.

The display 708 may include an external feed panel 720. The external feed panel 720 may include three multimedia stream tiles: multimedia stream tile 760, multimedia stream tile 762, and multimedia stream tile 764. Each of the multimedia stream tiles 760, 762, and 764 may provide a multimedia stream that was shared by a meeting participant.

At some point during the virtual meeting, the dynamic prominence functionality may identify a relevant multimedia stream. For example, the dynamic prominence functionality may identify a relevant multimedia stream based on a visual signature or an audio signature. A visual signature may include any visual activity provided in the multimedia stream, such as a crane moving or a car driving. An audio signature may include any audible activity, such as a speaker beginning a speech or the sound of jackhammering. The dynamic prominence functionality may, in some embodiments, analyze the context of the visual signature or audio signature to determine the relevance of the identified visual signature. For example, a person speaking in a multimedia stream may be an on-looker chatting with another on-looker, and thus irrelevant to a speaker beginning a speech.

Once a multimedia stream is identified as relevant, then the dynamic may increase the prominence of the relevant multimedia stream. For example, as illustrated, if the multimedia stream associated with the multimedia stream tile 760 is identified to have relevant content, then the multimedia stream tile 760 may increase in size, may change position, may become the focus of the display 708, may pulse or change colors, or otherwise visually change to focus the attention of the viewing participant(s). In some embodiments, instead of visually altering the multimedia stream tile 760, a corresponding audio stream may be altered to focus the attention of the viewing participant(s). For example, a corresponding audio stream for the multimedia stream tile 760 may increase in volume. In some embodiments, the relevant multimedia stream tile 760 may be both visually and audibly altered to capture the attention of a viewing participant.

In some embodiments, the priority of the multimedia stream tiles 760, 762, and 764 may alter based on identification of relevant content within a multimedia stream. For example, if relevant content is identified in the multimedia stream tile 760, then the multimedia stream tile 760 may increase in priority. And as discussed above, based on an increase in priority, the multimedia stream tile 760 may change positions within the external feed panel 720. It can be appreciated that in some embodiments, more than one relevant stream may be identified simultaneously.

Figure 8:
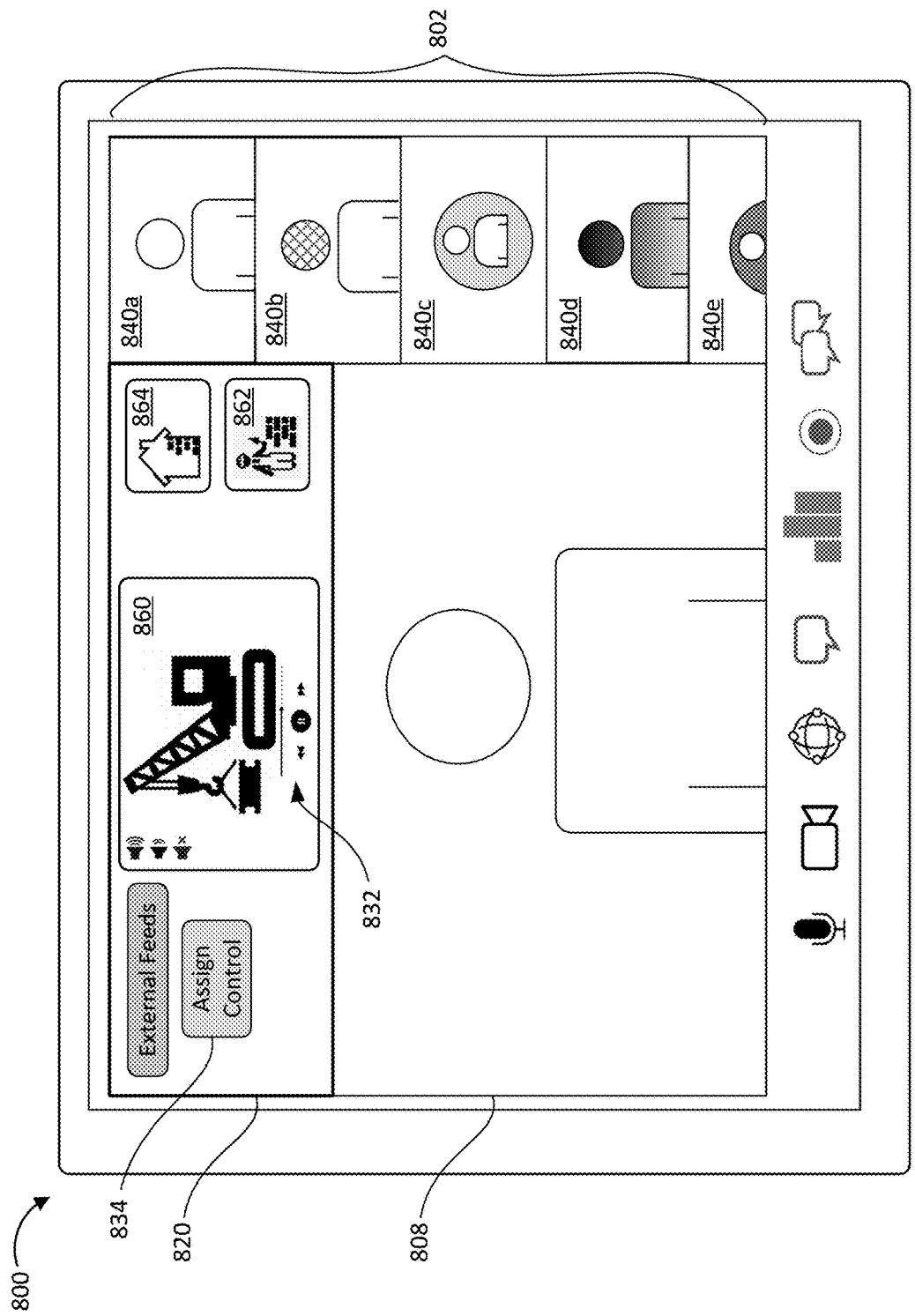
FIG. 8 illustrates another GUI having increased prominence of a multimedia stream, according to an embodiment herein.

Referring now to FIG. 8, another example GUI 800 having increased prominence of a multimedia stream is illustrated, according to an embodiment herein. The GUI 800 may be the same as the GUI 400, 600, or 700. For example, the GUI 800 may include a roster 802 showing participants 840a-840e, which may be the same or similar to the roster 402 showing participants 440a-440e. Similarly, the GUI 800 may include a display 808, which may be the same or similar to the display 408.

The display 708 may include an external feed panel 820 providing a multimedia stream tile 860, a multimedia stream tile 862, and a multimedia stream tile 862. In the illustrated example, the multimedia stream tile 860 may be identified by the dynamic prominence functionality as having relevant content. As such, the prominence of the multimedia stream tile 860 may be increased within the external feed panel 820. In another embodiment, the prominence of the multimedia stream tile 860 may be increased because a sharing participant has selected the multimedia stream tile 860. For example, the sharing participant may want to direct the meeting participants' focus to the multimedia stream tile 860. As such, the sharing participant may select the multimedia stream tile 860 and upon selection the multimedia stream tile 860 may increase in prominence. It should be appreciated that a host or co-host may have the same control over a multimedia stream as the sharing participant, unless the sharing participant explicitly restricts the host's or co-host's control over the multimedia stream.

The multimedia stream tile 860 may include one or more controls 832. The controls 832 may allow the sharing participant to control the multimedia stream. For example, the controls 832 may allow the sharing participant to modify a playback status of the multimedia stream. A playback status may include pausing, stopping, playing the multimedia stream, as well as fast forwarding, rewinding, or skipping to a specific time within the multimedia stream. The playback status may also include a playback speed, such as 2x speed or slow-motion playback of the multimedia stream. In some embodiments, the playback status may also include a volume of an audio stream associated with the multimedia stream or whether to include the audio stream at all.

The controls 832 may also include control over which participants the multimedia stream tile 860 is shared with, a duration of time that the multimedia stream tile 860 is shared, the ability to take a snapshot of the multimedia stream tile 860, the ability to modify the content of the multimedia stream tile 860, such as blur or select a portion of the stream, and when the connection between the video conference provider 310 and the multimedia stream is terminated. In some embodiments, default settings for the controls 832 may include that the sharing of the multimedia stream 860 may be for all participants of the meeting and the host (or co-host) would be allowed to control the feed of the multimedia stream tile 860. Control over the feed may include the prominence of the multimedia stream tile 860, highlighting content within the multimedia stream tile 860, or whether the feed from the multimedia stream tile 860 is modified (e.g., paused, rewound, snapshotted, etc.).

The sharing participant may be assigned the controls 832 over the multimedia stream 860. However, in some embodiments, the sharing participant may assign the controls 832 to another meeting participant. For example, the sharing participant may select an assign control button 834 to assign the controls 832 to another meeting participant. This can allow a sharing participant to grant controls to another meeting participant. For example, the sharing participant may be an individual in an IT department or a security department who joins the meeting simply to provide a connection to the multimedia stream. The sharing participant may not be a participant who discusses the content of the multimedia stream. As such, the sharing participant may assign the controls 832 to another meeting participant so that the other participant can have control over the multimedia stream tile 860 when presenting or discussing the contents of the stream. In some embodiments, the sharing participant may even exit or leave the virtual meeting while the connection to the multimedia stream persists. As can be appreciated, if the sharing participant joins simply to provide a connection to the multimedia stream, the sharing participant may not need to remain in the virtual meeting once the connection is established and the multimedia stream is shared. As such, once the controls 832 over the multimedia stream tile 760 are assigned to another participant, the sharing participant can exit the virtual meeting while the other participant maintains control over the multimedia stream tile 760. In some embodiments, the assignment of controls 832 over the multimedia stream tile 860 may be provided only for a specified time duration. Once the time duration is completed, then the assignment of the controls 832 to the other participant may be terminated and assignment of the controls 832 may revert back to the sharing participant. Again, this may allow the sharing participant granular control over the sharing of the multimedia stream, including the assignment of controls 832 over the multimedia stream tile 860.

Figure 9:
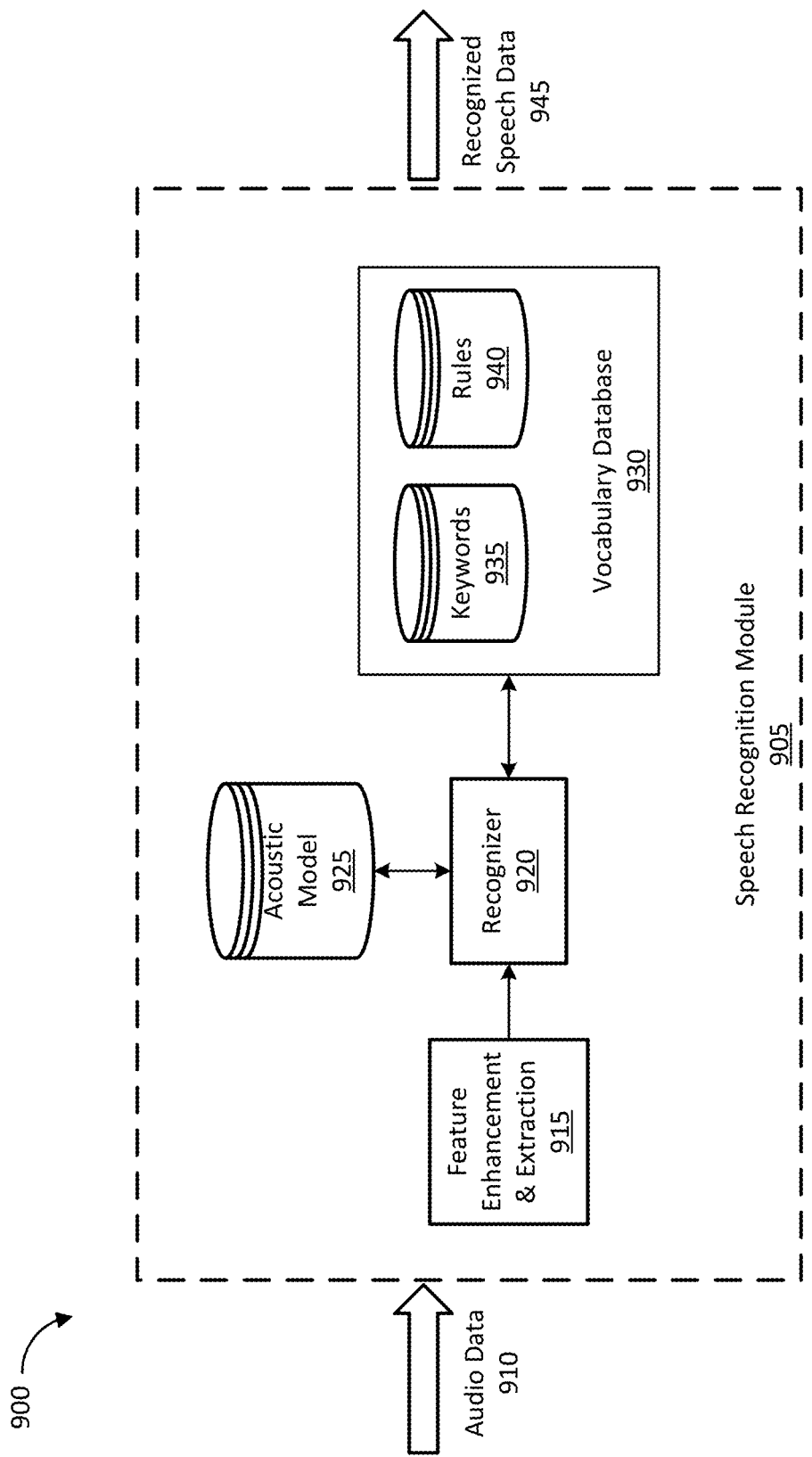
FIG. 9 illustrates an example speech recognition system that may be locally or remotely executed, according to an embodiment herein.

As noted above, the dynamic prominence functionality may monitor the shared multimedia streams for visual and audio signatures. Turning now to FIG. 9, an example speech recognition system 900 that may be used for the dynamic response functionality, is provided. The speech recognition system 900 may be executed locally or remotely. For example, the speech recognition system 900 may be locally executed on a client device, however, in other embodiments, the speech recognition system 900 may be cloud-based and/or remotely executed by a video conference provider, such as the video conference provider 310, or a third-party system.

Figure 10:
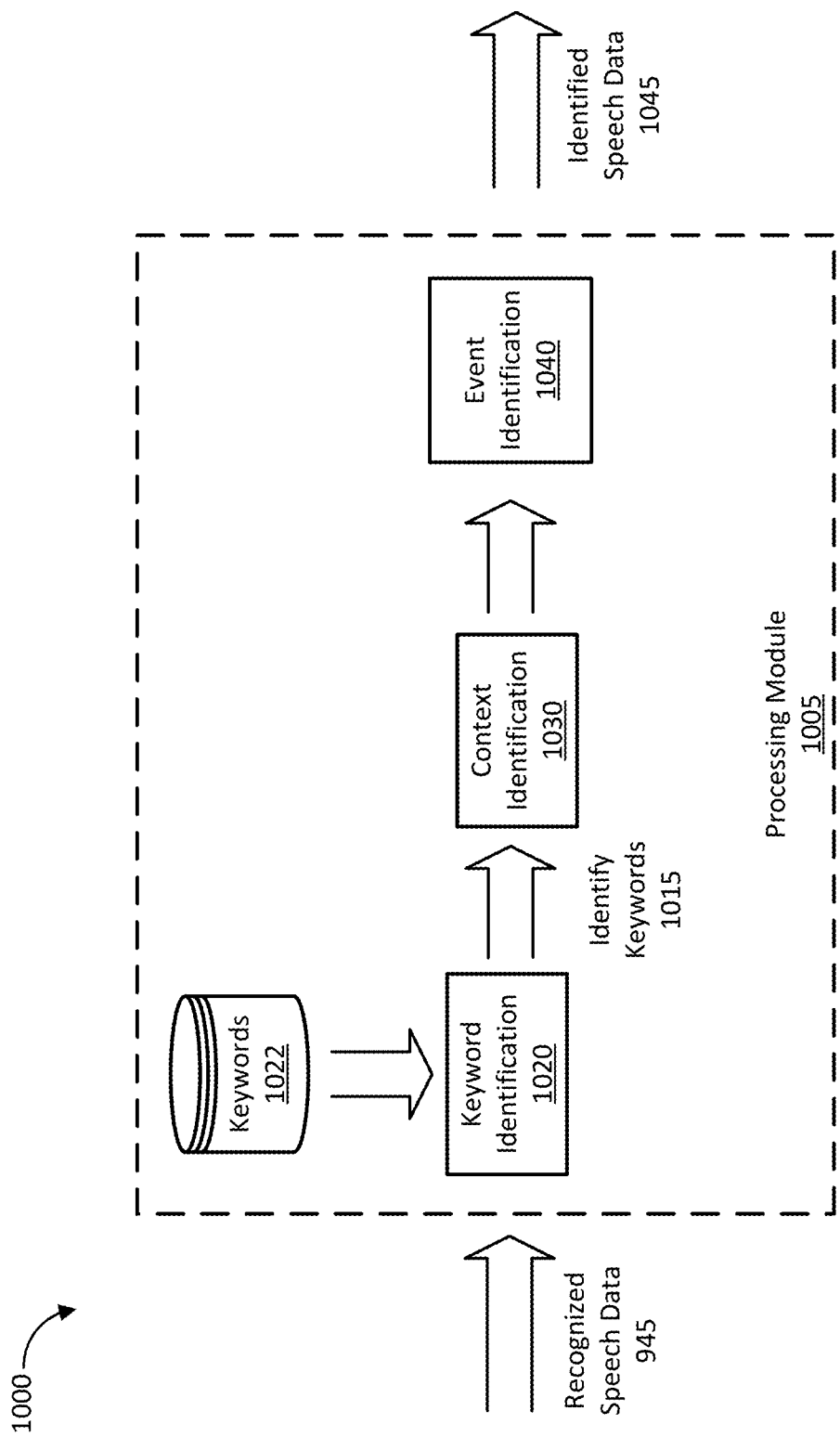
FIG. 10 illustrates an example event identification system that may be locally or remotely executed, according to an embodiment herein.

The speech recognition system 900, along with the system 1000 described in greater detail with respect to FIG. 10, may be used to perform one or more of the functions described herein. In some embodiments, the speech recognition system 900 may be used as part of the dynamic prominence functionality to identify relevant content within shared multimedia streams. For example, the speech recognition system 900 may identify keywords in an audio stream from a shared multimedia stream indicating relevant content.

To perform speech recognition, the speech recognition system 900 may include a speech recognition module 905. The speech recognition module 905 may receive audio data 910. The audio data 910 may correspond to audio captured by a respective device capturing a multimedia stream, for example by a microphone. In other embodiments, the audio data 910 may be received from the video conference provider 310. The audio data 910 may be a recording of an audio track or may be a transcript of the audio track. The speech recognition module 905 may be or include a speech recognition system or model as known in the art. The following is an example speech recognition module following an example speech recognition process; however, it should be understood that other speech recognition modules or processes may be used.

Once the audio data 910 is received by the speech recognition module 905, the audio data 910 may be processed by a feature enhancement and extraction module 915. The feature enhancement and extraction module 915 may analyze the audio data for features corresponding to words and then enhance and extract any identified features. The identified features may correspond to audio waveforms present in human speech.

The speech recognition module 905 may also include a recognizer 920. The recognizer 920 may receive the identified features from the audio data 910. The recognizer 920 may employ an acoustic model 925 and a vocabulary database 930 to determine or associate the identified features in the audio data 910 to one or more words.

In an example embodiment, the acoustic model 925 may analyze the raw audio waveforms in the identified features and determine a corresponding phoneme for each waveform. In some embodiments, this is performed at the character or subword level. The vocabulary database 930 may be a language model. The vocabulary database 930 may include a rules database 940 and a word database 935. The rules database 940 may provide various rules for speech, allowing the recognizer to discard any association of identified features (e.g., audio waveforms) to phonemes that are improbable given the constraints of proper grammar and the topic of discussion. Once an appropriate mapping of the identified features to phonemes is generated, the recognizer 920 may determine words associated with the phonemes. The words may be based on the words database 935.

Once the phonemes are associated with respective words, recognized speech data 945 is generated. It should be understood that this process may be performed nearly instantaneously. For example, the speech recognition module 905 may generate the recognized speech data 945 during the meeting as the audio streams associated with the shared multimedia streams are being received by the video conference provider 310 or another system that is hosting the speech recognition system 900. The recognized speech 945 may be then used to perform one or more functions, such the dynamic prominence functionality.

Turning now to FIG. 10, an example system 1000 is provided. The system 1000 may perform one or more of the functions of the dynamic prominence functionality, as described herein. The system 1000 may include processing module 1005 that is used to perform one or more of the dynamic prominence functions described herein. For example, in one case, the recognized speech 945 may be received from the speech recognition system 1000 to identify relevant content in a shared multimedia stream.

The recognized speech 945 may be received by the keyword identification system 1020. The keyword identification system 1020 may identify one or more keywords in the recognized speech data 1045. The database of known keywords 1022 may be queried to identify any keywords in the track of recognized speech data 1045. Keywords in the keyword database 1022 may be based on keywords associated with common events. For example, keywords may include words like "Welcome," "Let's get started, "Hello Everyone," and the like. In some embodiments, keywords may include one or more emotion expressions, such as laughing or crying.

It should be understood that a keyword may include more than one word. For example, "Let's get started" may be a "keyword" as indicating that a speaker is beginning a presentation. Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "look," "looks," and "looking." In some examples each of these may be a distinct keyword, while in other examples, the variants may be associated with a base term, e.g., "look," that is used as the keyword. However, any suitable approach to recognizing keywords may be used.

In some embodiments, a keyword may include or be an audio signature or audio activity. For example, a keyword may include screaming, loud noises, or other distinct audio sounds that are known to correspond with events (e.g., a car moving). In other embodiments, a keyword may include or be an accent or other vocal feature, such as a lisp.

If one or more keywords 1015 is recognized, the processing module 1005 then may identify a context 1030 associated with the keyword 1015. In this example, to identify a context, the processing module 1005 may employ a trained machine learning ("ML") technique to semantically analyze the speech or transcript associated with the identified keyword 1015 to determine additional related keywords and/or descriptors. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for" may be omitted from the word count in some examples.

Since people may use jargon or colloquial terms to refer to particular actions, the context identification 1030 functionality may normalize recognized words to specific meanings. For example, the terms "kids," "offspring," "kiddos," "little ones," etc. all refer to children. Thus, the context identification 1030 functionality may map such terms to have a single meaning (e.g., children). Such mappings may be provided for multiple different phrases and corresponding terms. Similarly, synonyms or words related to keywords may also be identified.

Once the context identification 1030 has identified the one or more keywords 1015 and identified the context of the identified keywords 1015, the processing module 1005 may perform an event identification 1040. The processing module 1005 may determine, based on the identification of the keywords 1015, and the context of the keywords, that the keywords 1015 correspond to an event. Based on predetermined keywords and context, the event identification 1040 may determine an event corresponding to identified keywords 1015 is present in a shared multimedia stream. For example, the event identification 1040 may determine that the shared multimedia stream 760 includes crane moving based on the identified keywords "starting the crane" or the sound of the crane moving in an audio stream associated with the multimedia stream 760.

The event identification 1040 may process the keywords 1015 in the audio data to generate identified speech data 1045. The identified speech data 1045 may include speech data that has been identified as being relevant to an event, such as containing an audio signature. In some embodiments, the identified speech data 1045 may be used to change the prominence of a shared multimedia stream during a virtual meeting.

Figure 11:
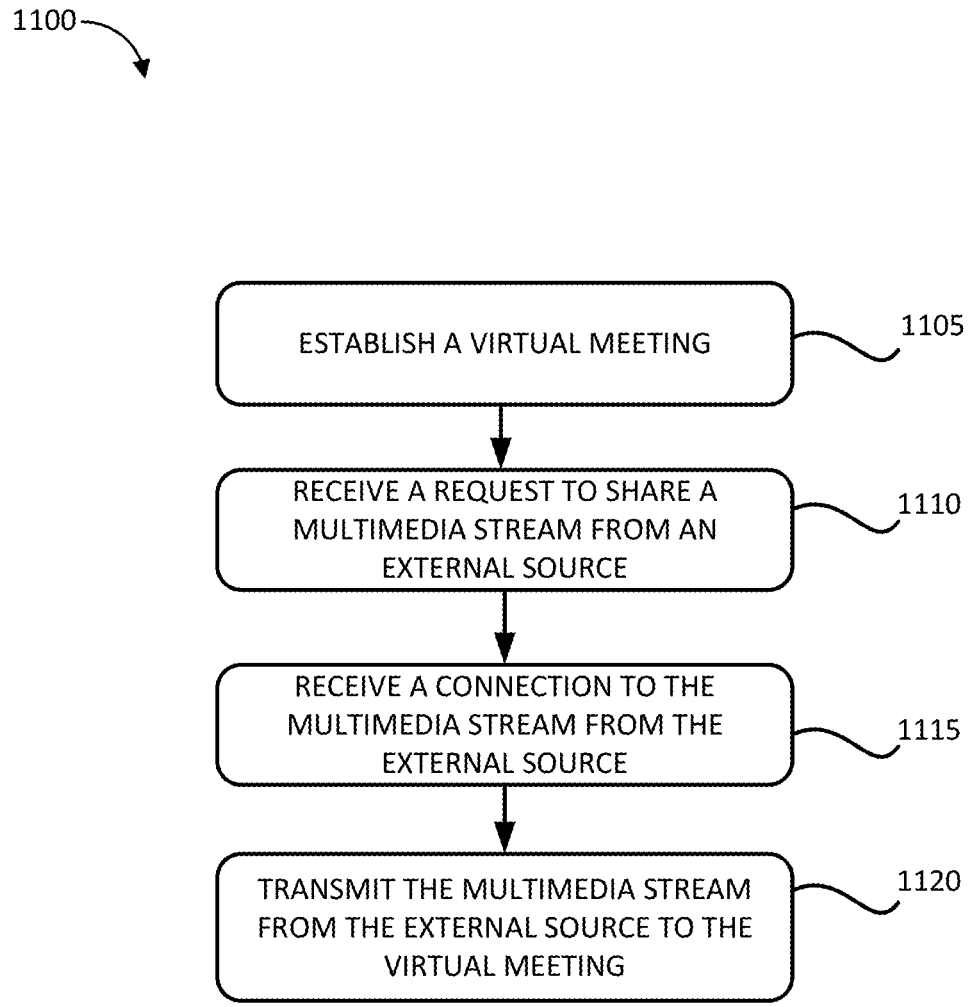
FIG. 11 illustrates an example method for aggregation and distribution of diverse multimedia feeds, according to an embodiment herein.

Referring now to FIG. 11, a flowchart of an example method 1100 for aggregation and distribution of diverse multimedia feeds is provided, according to an embodiment herein. The description of the method 1100 in FIG. 11 will be made with reference to FIGS. 3-10, however any suitable system according to this disclosure may be used, such as the example systems 100 and 200, shown in FIGS. 1 and 2.

The method 1100 may include steps 1105 and 1110. At step 1105, the method 1100 may include establishing, by a video conference provider, a virtual meeting having participants. For example, the video conference provider 310 may establish a virtual meeting for participants associated with client devices 340a-m. Each participant may join the virtual meeting using a respective client device (e.g., client devices 340a-m) to exchange one or more audio or video streams via the virtual meeting.

At step 1110, the method 1100 may include receiving, from a first client device, a request to share a multimedia stream from an external source with one or more of the client devices. For example, the client device 340a may request to share a multimedia stream from an external source with the other meeting participants during the virtual meeting. As described above, the multimedia stream may be live-streamed from the external source or may be a recording from the external source.

The method 1100 may also include steps 1115 and 1120. At step 1115, the method 1100 may include receiving a connection to the multimedia stream from the external source. For example, a direct connection between the video conference provider and the external source may be established. In some embodiments, this may include determining, by the video conference provider, that the multimedia stream from the external source requires authorization information to access, requesting, by the video conference provider, the authorization information from the first client device, and receiving, by the video conference provider, the authorization information from the first client device. An example illustration of requesting and receiving authorization information is discussed above with respect to FIG. 5.

At step 1120, the method 1100 may include transmitting, by the video conference provider, the multimedia stream from the external source to the one or more client devices via the virtual meeting. For example, the multimedia stream associated with the multimedia stream tile 460 may be transmitted, via the video conference provider 310, to the participants 440a-440e during the virtual meeting. In some embodiments, prior to transmitting the multimedia stream with the one or more client devices during the virtual meeting, a preview of the multimedia stream may be transmitted to the sharing client device.

In some embodiments, upon sharing the multimedia stream with the one or more client devices, the sharing client device (e.g., the first client device) may retain control over a playback status of the multimedia stream. A playback status may include controls to play, pause, fast forward, rewind, etc. the multimedia stream. In such cases, the method 1100 may include receiving, by the video conference provider, an indication to modify the playback status of the multimedia stream from the external source and modifying, by the video conference provider, the playback status of the multimedia stream based on the indication. For example, modifying the playback status of the multimedia stream based on the indication may include transmitting, by the video conference provider, an indication to the first client device to provide a playback view of the multimedia stream, modifying, by the video conference provider, the multimedia stream based on the indication via the playback view, and receiving, by the video conference provider, a request to share the playback view of the multimedia stream with the one or more client devices via the virtual meeting.

In some embodiments, the sharing participant may be able to transfer control over the playback status of the multimedia stream to a second client device. In such cases, the method 1100 may include receiving, from the first client device, an indication to transfer control over the playback status of the multimedia stream to a second client device and transferring, by the video conference provider, the control over the playback status of the multimedia stream from the first client device to the second client device. In some cases, the indication to transfer control to the second client device may include a time duration for the transfer. In such cases, the method 1100 may include determining, by the video conference provider, that the time duration is complete and transferring, by the video conference provider, the control over the playback status back to the first client device.

In some embodiments, the method 1100 may also include receiving, from a second client device of the plurality of client devices, a request to share a second multimedia stream from a second external source with one or more of the client devices, receiving a connection to the second multimedia stream from the second external source, and transmitting, by the video conference provider, the second multimedia stream from the second external source to the one or more client devices via the virtual meeting, wherein the second external source is different from the external source.

Transmission of the multimedia stream during the virtual meeting may terminate when the meeting terminates. However, in other cases, the transmission of the multimedia stream may maintain after the sharing participant leaves the virtual meeting. In such cases, the method 1100 may include receiving, by the video conference provider, a notification that the first client device is leaving the virtual meeting, terminating, by the video conference provider, transmission of the one or more audio or video streams to the first client device, and maintaining transmission, by the video conference provider, of the multimedia stream from the external source to the one or more client devices.

In some cases, more than one participant may share a multimedia stream from an external source. In such cases, the method 1100 may include receiving, from a second client device, a request to share a second multimedia stream from a second external source with one or more of the client devices, receiving a connection to the second multimedia stream from the second external source, and transmitting, by the video conference provider, the second multimedia stream from the second external source to the one or more client devices via the virtual meeting, where the second external source is different from the external source. When a second multimedia stream is shared, the method 1100 may include transmitting, by the video conference provider, a first indication to the one or more client devices to display a first tile corresponding to the multimedia stream during the virtual meeting and transmitting, by the video conference provider, a second indication to the one or more client devices to display a second tile corresponding to the second multimedia stream during the virtual meeting. The first tile may include descriptive information for the multimedia stream and the second tile may include descriptive information for the second multimedia stream.

In embodiments where there is more than one multimedia stream shared during the virtual meeting, a priority may be determined for the shared multimedia streams. For example, the method 1100 may include determining, by the video conference provider, a first priority of the multimedia stream, determining, by the video conference provider, a second priority of the first multimedia stream, and transmitting, by the video conference provider, an indication to the one or more client devices to modify a display of the first multimedia stream and the second multimedia stream based on the first priority and the second priority. The indication to modify the display of the multimedia stream and the second multimedia stream may cause a prominence of the first multimedia stream on the display to increase or decrease. In some cases, a change of prominence of a multimedia stream on the display may cause the video conference provider to transmit an indication to mute an audio stream associated with one of the multimedia streams based on the priority of the multimedia streams. The method 1100 may optionally include recording the multimedia stream and/or recording the second multimedia stream.

Figure 12:
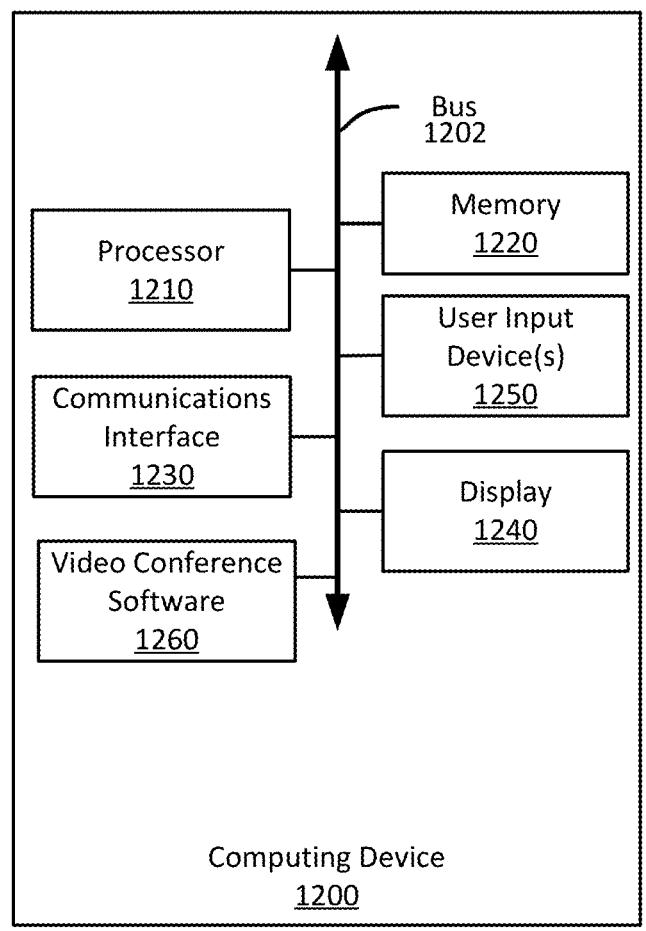
FIG. 12 shows an example computing device suitable for aggregation and distribution of diverse multimedia feeds, according to this disclosure.

Referring now to FIG. 12, FIG. 12 shows an example computing device 1200 suitable for use in example systems or methods aggregation and distribution of diverse multimedia feeds. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for aggregation and distribution of diverse multimedia feeds, such as part or all of the example method 1100, described above with respect to FIG. 11. For example, the video conferencing software 1260 provided on the computing device 1200 may provide instructions for performing one or more steps of the method 1100 for aggregation and distribution of diverse multimedia feeds. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: establishing, by a video conference provider, a virtual meeting having a plurality of participants, each participant of the plurality of participants using a respective client device of a plurality of client devices to exchange one or more audio or video streams via the virtual meeting; receiving, from a first client device of the plurality of client devices, a request to share a multimedia stream from an external source with one or more of the plurality of client devices; receiving a connection to the multimedia stream from the external source; and transmitting, by the video conference provider, the multimedia stream from the external source to the one or more client devices via the virtual meeting.

Example 2 is the method of any previous or subsequent Example, wherein the multimedia stream is live-streamed from the external source to the one or more client devices via the virtual meeting.

Example 3 is the method of any previous or subsequent Example, wherein receiving the connection to the multimedia stream from the external source further comprises: determining, by the video conference provider, that the multimedia stream from the external source requires authorization information to access; requesting, by the video conference provider, the authorization information from the first client device; and receiving, by the video conference provider, the authorization information from the first client device.

Example 4 is the method of any previous or subsequent Example, wherein the first client device retains control over a playback status of the multimedia stream from the external source, and the method further comprises: receiving, by the video conference provider, an indication to modify the playback status of the multimedia stream from the external source; and modifying, by the video conference provider, the playback status of the multimedia stream based on the indication.

Example 5 is the method of any previous or subsequent Example, wherein modifying, by the video conference provider, the playback status of the multimedia stream based on the indication further comprises: transmitting, by the video conference provider, an indication to the first client device to provide a playback view of the multimedia stream; modifying, by the video conference provider, the multimedia stream based on the indication via the playback view; and receiving, by the video conference provider, a request to share the playback view of the multimedia stream with the one or more client devices via the virtual meeting.

Example 6 is the method of any previous or subsequent Example, the method further comprising: transmitting, by the video conference provider, a preview of the multimedia stream to the first client device prior to transmitting the multimedia stream to the one or more client devices via the virtual meeting.

Example 7 is the method of any previous or subsequent Example, the method further comprising: receiving, from a second client device of the plurality of client devices, a request to share a second multimedia stream from a second external source with one or more of the plurality of client devices; receiving a connection to the second multimedia stream from the second external source; and transmitting, by the video conference provider, the second multimedia stream from the second external source to the one or more client devices via the virtual meeting, wherein the second external source is different from the external source.

Example 8 is the method of any previous or subsequent Example, the method further comprising: establishing a direct connection between the video conference provider and the external source.

Example 9 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: establish, by a video conference provider, a virtual meeting having a plurality of participants, each participant of the plurality of participants using a respective client device of a plurality of client devices to exchange one or more audio or video streams via the virtual meeting; receive, from a first client device of the plurality of client devices, a request to share a multimedia stream from an external source with one or more of the plurality of client devices; receive a connection to the multimedia stream from the external source; and transmit, by the video conference provider, the multimedia stream from the external source to the one or more client devices via the virtual meeting.

Example 10 is the system of any previous or subsequent Example, wherein the first client device retains control over a playback status of the multimedia stream from the external source, and the processor is further configured to execute processor-executable instructions stored in the non-transitory computer-readable medium to: receive, by the video conference provider, an indication to modify the playback status of the multimedia stream from the external source; and modify, by the video conference provider, the playback status of the multimedia stream based on the indication.

Example 11 is the system of any previous or subsequent Example, wherein the processor is further configured to execute processor-executable instructions stored in the non-transitory computer-readable medium to: receive, from the first client device, an indication to transfer control over the playback status of the multimedia stream to a second client device, wherein the plurality of client devices comprises the second client device; and transfer, by the video conference provider, the control over the playback status of the multimedia stream from the first client device to the second client device.

Example 12 is the system of any previous or subsequent Example, wherein the indication to transfer control comprises a time duration for transferring the control over the playback status to the second client device, and the processor is further configured to execute processor-executable instructions stored in the non-transitory computer-readable medium to: determine, by the video conference provider, that the time duration is complete; and transfer, by the video conference provider, the control over the playback status back to the first client device.

Example 13 is the system of any previous or subsequent Example, wherein the processor is further configured to execute processor-executable instructions stored in the non-transitory computer-readable medium to: receive, by the video conference provider, a notification that the first client device is leaving the virtual meeting; terminate, by the video conference provider, transmission of the one or more audio or video streams to the first client device; and maintain transmission, by the video conference provider, of the multimedia stream from the external source to the one or more client devices.

Example 14 is the system of any previous or subsequent Example, wherein the processor is further configured to execute processor-executable instructions stored in the non-transitory computer-readable medium to: receive, from a second client device of the plurality of client devices, a request to share a second multimedia stream from a second external source with one or more of the plurality of client devices; receive a connection to the second multimedia stream from the second external source; and transmit, by the video conference provider, the second multimedia stream from the second external source to the one or more client devices via the virtual meeting, wherein the second external source is different from the external source.

Example 15 is the system of any previous or subsequent Example, wherein the processor is further configured to execute processor-executable instructions stored in the non-transitory computer-readable medium to: transmit, by the video conference provider, a first indication to the one or more client devices to display a first tile corresponding to the multimedia stream during the virtual meeting; and transmit, by the video conference provider, a second indication to the one or more client devices to display a second tile corresponding to the second multimedia stream during the virtual meeting.

Example 16 is the system of any previous or subsequent Example, wherein: the first tile comprises descriptive information for the multimedia stream; and the second tile comprises descriptive information for the second multimedia stream.

Example 17 is a non-transitory computer-readable medium comprising processor-executable instructions configured to cause one or more processors to: establish, by a video conference provider, a virtual meeting having a plurality of participants, each participant of the plurality of participants using a respective client device of a plurality of client devices to exchange one or more audio or video streams via the virtual meeting; receive, from a first client device of the plurality of client devices, a request to share a multimedia stream from an external source with one or more of the plurality of client devices; receive a connection to the multimedia stream from the external source; and transmit, by the video conference provider, the multimedia stream from the external source to the one or more client devices via the virtual meeting.

Example 18 is the non-transitory computer-readable medium of any previous or subsequent Example, wherein the processor is further configured to execute processor-executable instructions stored in the non-transitory computer-readable medium to: receive, from a second client device of the plurality of client devices, a request to share a second multimedia stream from a second external source with one or more of the plurality of client devices; receive a connection to the second multimedia stream from the second external source; and transmit, by the video conference provider, the second multimedia stream from the second external source to the one or more client devices via the virtual meeting, wherein the second external source is different from the external source.

Example 19 is the non-transitory computer-readable medium of any previous or subsequent Example, wherein the processor is further configured to execute processor-executable instructions stored in the non-transitory computer-readable medium to: determine, by the video conference provider, a first priority of the multimedia stream; determine, by the video conference provider, a second priority of the first multimedia stream; and transmit, by the video conference provider, an indication to the one or more client devices to modify a display of the first multimedia stream and the second multimedia stream based on the first priority and the second priority.

Example 20 is the non-transitory computer-readable medium of any previous or subsequent Example, wherein the indication to modify the display of the multimedia stream and the second multimedia stream causes a prominence of the first multimedia stream on the display to increase.

Example 21 is the non-transitory computer-readable medium of any previous or subsequent Example, wherein processor-executable instructions to transmit, by the video conference provider, the indication to the one or more client devices to modify a display of the multimedia stream and the second multimedia stream based on the first priority and the second priority cause the processor to execute further processor-executable instructions stored in the non-transitory computer-readable medium to: transmit, by the video conference provider, an indication to mute an audio stream associated with at least one of the multimedia stream or the second multimedia stream based on the first priority and the second priority.

Example 22 is the non-transitory computer-readable medium of any previous or subsequent Example, wherein the processor is further configured to execute processor-executable instructions stored in the non-transitory computer-readable medium to: record, by the video conference provider, the multimedia stream; and record, by the video conference provider, the second multimedia stream.

That which is claimed is:

1. A method comprising:
   establishing, by a video conference provider, a virtual meeting having a plurality of participants, each participant of the plurality of participants using a respective client device of a plurality of client devices to exchange one or more audio or video streams via the virtual meeting;
   receiving, from a first client device of the plurality of client devices, a request to share a multimedia stream from an external source with one or more of the plurality of client devices;
   receiving a connection to the multimedia stream from the external source, wherein receiving the connection to the multimedia stream from the external source involves:
      determining, by the video conference provider, that the multimedia stream from the external source requires authorization information to access;
      requesting, by the video conference provider, the authorization information from the first client device; and
      receiving, by the video conference provider, the authorization information from the first client device;
   transmitting, by the video conference provider, the multimedia stream from the external source to one or more client devices via the virtual meeting;
   wherein the first client device retains control over a playback status of the multimedia stream, and the method further comprises:
      receiving, by the video conference provider, an indication from the first client device to modify the playback status of the multimedia stream; and
      modifying, by the video conference provider, the playback status of the multimedia stream based on the indication.

2. The method of claim 1, wherein the multimedia stream is live-streamed from the external source to one or more client devices via the virtual meeting.

3. The method of claim 1, wherein modifying, by the video conference provider, the playback status of the multimedia stream based on the indication further comprises:
   transmitting, by the video conference provider, an indication to the first client device to provide a playback view of the multimedia stream;
   modifying, by the video conference provider, the multimedia stream based on the indication via the playback view; and
   receiving, by the video conference provider, a request to share the playback view of the multimedia stream with the one or more client devices via the virtual meeting.

4. The method of claim 1, the method further comprising:
   establishing a direct connection between the video conference provider and the external source.

5. A system comprising:
   a non-transitory computer-readable medium;
   a communications interface; and
   a processor communicatively coupled to the non-transitory computer-readable medium and the communications interface, the processor configured to execute processor-executable instructions stored in the non-transitory computer-readable medium to:
      establish, by a video conference provider, a virtual meeting having a plurality of participants, each participant of the plurality of participants using a respective client device of a plurality of client devices to exchange one or more audio or video streams via the virtual meeting;
      receive, from a first client device of the plurality of client devices, a request to share a multimedia stream from an external source with one or more of the plurality of client devices;
      receive a connection to the multimedia stream from the external source, wherein receiving the connection to the multimedia stream from the external source involves:
         determining, by the video conference provider, that the multimedia stream from the external source requires authorization information to access;
         requesting, by the video conference provider, the authorization information from the first client device; and
         receiving, by the video conference provider, the authorization information from the first client device;
      transmit, by the video conference provider, the multimedia stream from the external source to one or more client devices via the virtual meeting, wherein the first client device retains control over a playback status of the multimedia stream;
      receive, by the video conference provider, an indication from the first client device to modify the playback status of the multimedia stream; and
      modify, by the video conference provider, the playback status of the multimedia stream based on the indication.

6. The system of claim 5, wherein the processor is further configured to execute processor-executable instructions stored in the non-transitory computer-readable medium to:
   receive, from the first client device, an indication to transfer control over the playback status of the multimedia stream to a second client device, wherein the plurality of client devices comprises the second client device; and
   transfer, by the video conference provider, the control over the playback status of the multimedia stream from the first client device to the second client device.

7. The system of claim 6, wherein the indication to transfer control comprises a time duration for transferring the control over the playback status to the second client device, and the processor is further configured to execute processor-executable instructions stored in the non-transitory computer-readable medium to:
   determine, by the video conference provider, that the time duration is complete; and
   transfer, by the video conference provider, the control over the playback status back to the first client device.

8. The system of claim 5, wherein the processor is further configured to execute processor-executable instructions stored in the non-transitory computer-readable medium to:
receive, by the video conference provider, a notification that the first client device is leaving the virtual meeting;
terminate, by the video conference provider, transmission of the one or more audio or video streams to the first client device; and
maintain transmission, by the video conference provider, of the multimedia stream from the external source to the one or more client devices.

9. The system of claim 5, wherein the processor is further configured to execute processor-executable instructions stored in the non-transitory computer-readable medium to:
receive, from a second client device of the plurality of client devices, a request to share a second multimedia stream from a second external source with one or more of the plurality of client devices;
receive a connection to the second multimedia stream from the second external source; and
transmit, by the video conference provider, the second multimedia stream from the second external source to the one or more client devices via the virtual meeting, wherein the second external source is different from the external source.

10. The system of claim 9, wherein the processor is further configured to execute processor-executable instructions stored in the non-transitory computer-readable medium to:
transmit, by the video conference provider, a first indication to the one or more client devices to display a first tile corresponding to the multimedia stream during the virtual meeting; and
transmit, by the video conference provider, a second indication to the one or more client devices to display a second tile corresponding to the second multimedia stream during the virtual meeting.

11. The system of claim 10, wherein:
the first tile comprises descriptive information for the multimedia stream; and
the second tile comprises descriptive information for the second multimedia stream.

12. A non-transitory computer-readable medium comprising processor-executable instructions configured to cause one or more processors of a video conference provider to:
establish a virtual meeting having a plurality of participants, each participant of the plurality of participants using a respective client device of a plurality of client devices to exchange one or more audio or video streams via the virtual meeting;
receive, from a first client device of the plurality of client devices, a request to share a multimedia stream from an external source with one or more of the plurality of client devices;
receive a connection to the multimedia stream from the external source, wherein receiving the connection to the multimedia stream from the external source involves:
determine that the multimedia stream from the external source requires authorization information to access;
request the authorization information from the first client device; and
receive the authorization information from the first client device;
transmit the multimedia stream from the external source to one or more client devices via the virtual meeting, wherein the first client device retains control over a playback status of the multimedia stream;
receive an indication from the first client device to modify the playback status of the multimedia stream; and
modify the playback status of the multimedia stream based on the indication.

13. The non-transitory computer-readable medium of claim 12, wherein the multimedia stream is a first multimedia stream, and wherein the one or more processors are further configured to execute processor-executable instructions stored in the non-transitory computer-readable medium to:
receive, from a second client device of the plurality of client devices, a request to share a second multimedia stream from a second external source with one or more of the plurality of client devices;
receive a connection to the second multimedia stream from the second external source; and
transmit, by the video conference provider, the second multimedia stream from the second external source to the one or more client devices via the virtual meeting, wherein the second external source is different from the external source.

14. The non-transitory computer-readable medium of claim 13, wherein the one or more processors are further configured to execute processor-executable instructions stored in the non-transitory computer-readable medium to:
determine, by the video conference provider, a first priority of the first multimedia stream;
determine, by the video conference provider, a second priority of the second multimedia stream; and
transmit, by the video conference provider, an indication to the one or more client devices to modify a display of the first multimedia stream and the second multimedia stream based on the first priority and the second priority.

15. The non-transitory computer-readable medium of claim 14, wherein the indication to modify the display of the multimedia stream and the second multimedia stream causes a prominence of the first multimedia stream on the display to increase.

16. The non-transitory computer-readable medium of claim 14, wherein the one or more processors are further configured to execute processor-executable instructions stored in the non-transitory computer-readable medium to:
transmit, by the video conference provider, an indication to mute an audio stream associated with at least one of the first multimedia stream or the second multimedia stream based on the first priority and the second priority.

17. The method of claim 1, wherein the multimedia stream is a first multimedia stream, and further comprising:
determining, by the video conference provider, a first priority of the first multimedia stream and a second priority of a second multimedia stream; and
transmit, by the video conference provider, an indication to the one or more client devices to modify a display of the first multimedia stream and the second multimedia stream based on the first priority and the second priority.

18. The method of claim 1, further comprising:
determining, by the video conference provider, a first priority of a first multimedia stream and a second priority of a second multimedia stream; and
transmitting, by the video conference provider, an indication to mute an audio stream associated with at least one of the first multimedia stream or the second multimedia stream based on the first priority of the first multimedia stream and the second priority of the second multimedia stream.

\* \* \* \* \*